United States Patent [19]
Tsujita

[11] Patent Number: 6,078,822
[45] Date of Patent: Jun. 20, 2000

[54] CORDLESS TELEPHONE SYSTEM AND ITS INDEPENDENT BASE STATION AND MOBILE STATION

[75] Inventor: Shigeru Tsujita, Kanagawa, Japan

[73] Assignee: NEC Corporation, Tokyo, Japan

[21] Appl. No.: 09/099,641

[22] Filed: Jun. 18, 1998

[30] Foreign Application Priority Data

Jun. 19, 1997 [JP] Japan ..................................... 9-162143

[51] Int. Cl.[7] .............................. H04B 1/38; H04Q 7/20; H04M 3/42
[52] U.S. Cl. ........................... 455/552; 455/426; 455/465
[58] Field of Search ..................................... 455/552, 426, 455/461, 553, 414, 465, 416, 422, 445, 74.1, 417, 462, 463, 458; 379/215

[56] References Cited

U.S. PATENT DOCUMENTS

| | | | |
|---|---|---|---|
| 5,309,502 | 5/1994 | Hirai | 455/462 |
| 5,442,680 | 8/1995 | Schellinger et al. | 455/552 |
| 5,463,674 | 10/1995 | Gillig et al. | 455/552 |
| 5,675,629 | 10/1997 | Raffel et al. | 455/426 |
| 5,774,805 | 6/1998 | Zicker | 455/552 |
| 5,870,673 | 2/1999 | Haartsen | 455/552 |
| 5,878,344 | 3/1999 | Zicker | 455/552 |

FOREIGN PATENT DOCUMENTS

| | | |
|---|---|---|
| 66854 | 1/1994 | Japan . |
| 685916 | 3/1994 | Japan . |

*Primary Examiner*—William G. Trost
*Assistant Examiner*—Tracy M. Legree
*Attorney, Agent, or Firm*—Ostrolenk, Faber, Gerb & Soffen, LLP

[57] ABSTRACT

A cordless telephone system including a independent base station and a dual purpose mobile station which enables the mobile station to respond to an incoming call from a public base station while a first phone call is being conducted by the mobile station through the independent base station. During this operation, the first phone call is either put on hold or disconnected thus enabling the mobile station to shift to the call from the public base station. The independent base station is provided with a public reception antenna, a reception radio circuit, a mobile station reception channel CODEC, a public reception control section, and a public reception interface, enabling it to receive a call signal from the public base station intended for the dual purpose mobile station. Due to this constitution, the independent base station receives the call signal from the public base station intended for the dual purpose mobile station during the first phone call.

12 Claims, 18 Drawing Sheets

CORDLESS TELEPHONE SYSTEM AND ITS INDEPENDENT BASE STATION AND MOBILE STATION

BACKGROUND OF THE INVENTION

The present invention relates to a cordless telephone system and its independent base station and mobile station. More to particularly the present invention relates to a cordless telephone system and its independent base station and mobile station in which the mobile station is connected to a mobile communication network or a fixed network, and it is capable of executing radio communication both to outdoor public base station (hereinafter referring to public base station) in which original communication service control is executed, and to cordless telephone system independent base station (herein after referring to home independent base station) connected to the fixed network.

DESCRIPTION OF THE PRIOR ART

Formerly, a public base station and a home independent base station, and cordless telephone system mobile station (hereinafter referring to dual purpose mobile station) which is capable of executing time-division multiplex radio communication enable a telephone call executed through the public base station (hereinafter referring to outdoor public telephone call), and a telephone call executed through a home independent base station (hereinafter referring to indoor self-supporting call) to be performed.

Hereinafter, the conventional cordless telephone system is described referring to the drawings.

FIG. 1 is a block diagram showing a configuration of the home independent base station of the conventional cordless telephone system. The device of the independent base station comprises an antenna 104 for performing transmission-reception of radio wave, a transmitter-receiver radio circuit 103 for executing demodulation of received radio waves and modulation of transmission data, an independent base station channel CODEC section 102 for executing both decoding of demodulation signals from the transmitter-receiver radio circuit 103 and coding of transmission data, a call/circuit control section 101 for executing voice coding of received sound signals from the fixed network and voice decoding of voice data decoded at the independent base station channel CODEC section 102 and for receiving a call signal from the fixed network, a home independent base station control section 505 for executing power control among the call/circuit control section 101, the independent base station channel CODEC section 102, and transmitter-receiver radio circuit 103, and for executing communication protocol control between the independent base station and mobile station.

FIG. 2 is a block diagram showing a configuration of a dual purpose mobile station of the conventional cordless telephone system. The conventional dual purpose mobile station comprises an antenna 204 for transmission-reception of radio waves, a transmitter-receiver radio circuit 203 for executing demodulation of received radio waves and modulation of transmission data, a dual purpose mobile station channel CODEC section 202 for executing decoding of demodulation signals from the transmitter-receiver radio circuit 203 and coding of transmission data, a speaker 206 for outputting voice audio, a microphone 207 for inputting voice audio, a telephone call control section 201 for executing voice coding of received sound signals from the microphone 207 and voice decoding of voice data decoded at the dual purpose mobile station channel CODEC section 202, and a dual purpose mobile station control section 605 for executing power control among the telephone call control section 201, the dual purpose mobile station channel CODEC section 202, and the transmitter-receiver radio circuit 203, and for executing communication protocol control between the home independent base station and the dual purpose mobile station control section or between the public base station and the same.

FIG. 3 is a view showing an operational environment of the conventional cordless telephone system. In this conventional cordless telephone system, a dual purpose mobile station 802 is capable of executing the telephone call through the home independent base station 801, and is capable of receiving radio waves from the public base station 403. However, when the dual purpose mobile station 802 is conducting a telephone call through the home independent base station, it is impossible to respond to an incoming call because the dual purpose mobile station 802 is incapable of receiving the radio waves from the public base station 403 so that it is incapable of receiving a call signal (822). The dual purpose mobile station 802 receives the call signal 822 which both the public base station 403 and the home independent base station 801 transmit intermittently while waiting the incoming from both of the public base station 403 and the home independent base station 801.

Subsequently, as shown in FIG. 4, when the timing of reception processing overlaps, the reception processing of the call signal (805) from the public station 403 is preferred, so that the dual purpose mobile station 802 does not perform the reception processing of the call signal (805) from the home independent base station 801. For this reason, the home independent base station 801 assumes that the dual purpose mobile station 802 is not within the reception area capable of receiving radio waves because it has not received a response from the dual purpose mobile station 802 in relation to the call signal 804. Further, in the reception processing, it is also possible to establish a preference for the home independent base station. In the dual purpose mobile station, when the call signal (805) is received from the public base station 403, the incoming processing steps 806 are executed between the dual purpose mobile station 802 and the public base station 403. At the end of the incoming processing 806, the dual purpose mobile station 802 transmits an in-calling signal (807) notifying the public base station 403 that the dual purpose mobile station 802 has recognized the incoming call. Simultaneously, the mobile station 802 transmits a ringing tone (808) for notifying the user of the incoming call. Subsequently, when the mobile station 802 detects a response (on hook (809)) from the user, the mobile station 802 shifts to the telephone call (811) and transmits response signal (810) to the public base station 403. When the telephone call is terminated, the mobile station returns to the incoming waiting state, and executes its disconnection processing (812).

FIG. 5 is a view showing operation of the conventional call waiting notification (catch-phone). The call waiting notification is adapted in both of the fixed network and the mobile communication network as shown in the Japanese Patent Application Laid-Open No. HEI 06-85916 and the Japanese Patent Application Laid-Open No. HEI 6-6854. A separate incoming arrives at the home independent base station 801 when the dual purpose mobile station is on a first telephone call (813) through the home independent base station 801. The home independent base station 801 causes the call waiting notification 814 to be transmitted to the dual purpose mobile station 802, while simultaneously originating a ringing tone for notifying the user of the new incoming call. Subsequently, when there is hook manipulation (815) by the user, the dual purpose mobile station 802 transmits the hooking signal (816) to the home independent base station 801. In response, the network switches to the second telephone call, and thus, the second telephone call 817 becomes possible. When the second telephone call 817 is terminated and the user implements the hook manipulation 818 again, the dual purpose mobile station 802 transmits the hooking signal (819), thus returning to the first telephone call (820) due to the switching of the network.

However, as shown in FIG. 6, although a call signal 822 is transmitted from the public base station 403 to the dual purpose mobile station while the dual purpose mobile station 802 is on an indoor self-supporting telephone call (821), the dual purpose mobile station 802 is incapable of responding to the incoming call 822 from the public base station 403 with the result that the dual purpose mobile station 802 continues the indoor self-supporting telephone call (823).

This is the reason why, as shown in FIG. 1, the home independent base station of the conventional cordless telephone system includes the antenna 104 for performing transmission-reception of radio waves the transmitter-receiver radio circuit 103 for executing both demodulation of received radio waves and modulation of transmission data, the independent base station channel CODEC section 102 for executing both decoding of the demodulation signals from the transmitter-receiver radio circuit 103 and coding of transmission data, the call/circuit control section 101 for executing voice coding of sound signals received from the fixed network and voice decoding of the voice data decoded at the independent base station channel CODEC section 102, and for receiving the call signal from the fixed network, and the home independent base station control section 505 for executing power control of the call/circuit control section 101, the independent base station channel CODEC section 102, and the transmitter-receiver radio circuit 103, and for executing the communication protocol control in between the mobile station and the independent base station. The home independent base station 801 does not possess means for receiving the call signal transmitted from the public base station 403 to the dual purpose mobile station 802. As shown in FIG. 2, the dual purpose mobile station of the conventional cordless telephone system includes the antenna 204 for performing transmission-reception of radio waves, the transmitter-receiver radio circuit 203 for executing both demodulation of received radio waves and modulation of transmission data, the dual purpose mobile station channel CODEC section 202 for executing both decoding of the demodulation signals from the transmitter-receiver radio circuit 203 and coding of the transmission data, the speaker 206 for outputting voice audio, the microphone 207 for inputting voice audio, the telephone call control section 201 for executing both voice coding of sound signals received from the microphone 207 and voice decoding of the sound data decoded at the dual purpose mobile station channel CODEC section 202, and the dual purpose mobile station control section 605 for executing power control of the telephone call control section 201, the dual purpose mobile station channel CODEC section 202, and the transmitter-receiver radio circuit 203, and for executing the communication protocol control in between the dual purpose mobile station and the home independent base station or the public base station. The dual purpose mobile station 802 does not possess the means for receiving the call signal transmitted asynchronously with the sound signal during a telephone call through the home independent base station. In conclusion, although the call signal is transmitted (822) from the public base station 403 to the dual purpose mobile station 802 while the dual purpose mobile station is on the indoor self-supporting telephone call (821), the dual purpose mobile station is incapable of responding to the incoming call signal 822.

Similarly, as shown in FIG. 7, although the call signal is transmitted (825) from the home independent base station 801 to the dual purpose mobile station 802 while the dual purpose mobile station 802 is on an outdoor public telephone call, the dual purpose mobile station 802 is incapable of responding to the incoming call signal 825, with the result that the dual purpose mobile station 802 continues the indoor self-supporting telephone call (826). The reason for this lack of capability is similar to the above described case of indoor self-supporting telephone call. The dual purpose mobile station 802 does not possess the means for receiving radio waves which are transmitted separately during the telephone call through the public base station 403, and the public base station 403 is incapable of receiving the call signal transmitted from the home independent base station 801 to the dual purpose mobile station 802 because the public base station 403 is incapable of finding the frequency of the radio waves by which the home independent base station 801 transmits the call signal, or the number of the dual purpose mobile station 802 in the cordless telephone system.

FIG. 8 is a flow chart showing the operation of the dual purpose mobile station control section 605 while the dual purpose mobile station 802 is on the indoor self-supporting telephone call. After entering the indoor self-supporting telephone call state (701), when the dual purpose mobile station 802 detects on-hook (702), it proceeds to telephone call end state (715) after executing the telephone call disconnection processing (703) which is actuated from the mobile station 802. When the dual purpose mobile station control section 605 does not detect the on-hook (702), but receives the disconnection signal from the side of the home independent base station (704), it proceeds to the telephone call end state (715) after executing the telephone call disconnection processing (705) which is actuated from the side of the independent base station 801. If the dual purpose mobile station control section 605 does not receive the disconnection signal from the home independent base station (704), but detects the hold manipulation by the user (706), and if the indoor self-supporting telephone call is already in the hold state (707), transmission of voice communication is started (709) after executing processing for removing the hold state of the indoor self-supporting telephone call (708). If the user does not hold the indoor self-supporting telephone call (707), processing is executed to hold the indoor self-supporting telephone call (710). The dual purpose mobile station 802 prevents transmission of audio (711), and plays a hold-melody (712) for notifying the hold to the user. When the dual purpose mobile station 802 does not detect the hold-manipulation by the user (706), but detects the hook manipulation by the user (713), it executes the transmission processing requirement of the hooking signal 714 to the home independent base station 801. When the hook manipulation by the user is not detected (713), the dual purpose mobile station 802 maintains the indoor self-supporting telephone call.

FIG. 9 is a flow chart showing operation of the home independent base station control section 505 while the dual purpose mobile station is on the indoor self supporting telephone call. After entering the indoor self-supporting telephone call state (716), when the home independent base station control section 505 receives the disconnection signal 717 from the dual purpose mobile station 802, it proceeds to the telephone call end state (730) after executing the telephone call disconnection processing 718 which is actuated from the side of the mobile station 802. If the home independent base station 801 does not receive the disconnection signal from the dual purpose mobile station (717), but detects circuit disconnection (719), it proceeds to the telephone call end state (730) after executing the telephone call disconnection processing (720) which is actuated from the side of the independent base station 801. When the home independent base station 801 does not detect the circuit disconnection (719), but receives 721 the telephone call holding requirement from the dual purpose mobile station 802, it executes hold set processing (722) to prevent voice transmission (723), and plays the hold-melody (724) for notifying the hold state to the user. When the home independent base station 801 does not receive 721 the telephone call holding requirement from the dual purpose mobile station 802, but receives the hold removal requirement (725), it restarts the transmission of voice (727) after executing the hold removal processing (726). When the home independent base station control section 505 does not receive 725 the hold removal requirement from the dual purpose mobile station 802, but receives the hooking signal transmission requirement (728), it transmits the hooking signal to the fixed network (729). While when the home independent base station 801 does not receive the hooking signal transmission requirement (728), it maintains the indoor self-supporting telephone call.

The problem points of the above-described conventional example are that although the public base station 403 transmits the call signal to the dual purpose mobile station 802, if the dual purpose mobile station is already on a telephone call with the home independent base station, the dual purpose mobile station 802 is incapable of responding to the incoming call from the public base station 403. Consequently, the dual purpose mobile station 403 is incapable of responding to the outdoor public telephone call during indoor self-supporting telephone call. Because the configuration of the dual purpose mobile station 802 does not enable it to receive the call signal transmitted with the different frequency from the signal of the indoor self-supporting telephone call and with the different timing therefrom.

SUMMARY OF THE INVENTION

In view of the foregoing, it is an object of the present invention to provide a cordless telephone system and its independent base station and mobile station which enables a home independent base station to receive a call signal transmitted from a public base station to a dual purpose mobile station instead of the dual purpose mobile station while the dual purpose mobile station is already in communication with the home independent base station. The dual purpose mobile station is capable of receiving both radio waves of the public base station and the home independent base station. After detection of the call from the public base station, the home independent base station transmits a call waiting notification signal to the mobile station which denotes that an accompanying control channel which is capable of performing transmission-reception of a control signal during the telephone call. The dual purpose mobile station enables the incoming call from the public base station to be implemented by receiving the call waiting notification signal. Thus the user of the mobile station is notified of the incoming call from the public base station which occurs during an indoor self-supporting telephone call, with the result that the cordless telephone system is capable of responding thereto.

The present invention provides a cordless telephone system including an independent base station and mobile station in which the mobile station is connected to mobile communication network or fixed network.

In one embodiment to be described below by way of example in illustration of the invention, a cordless telephone system includes an independent base station which is connected to a fixed network, a mobile station which is connected to the independent base station and either to a mobile communication network or a fixed network, and a public base station in which an original communication service control of the mobile communication is implemented. When the mobile station is communicating through the independent base station, the public base station attempts to transmit a call signal directly to the mobile station, but the independent base station receives the call signal instead of the mobile station. The independent base station transmits a call waiting notification signal to the mobile station which represents reception of the call signal during the telephone call between the mobile station and the independent base station. The mobile station receives the call waiting notification signal from the independent base station, and before executing the incoming processing between the mobile station and the public base station, it executes the hold operation of the present telephone call temporarily. When the incoming processing ends, calling the user by returning to the telephone call, and when there is a response from the user, enabling the mobile station itself to execute the telephone call to the public base station while either disconnecting or holding the telephone call toward the independent base station. When the telephone call toward the public base station is terminated, if the telephone call with the independent base station has been maintained in the hold state, the original telephone call is continued by removing the hold state.

In one particular embodiment, there is an independent base station which includes an antenna for performing transmission-reception of radio waves, a transmitter-receiver radio circuit for executing both demodulation of received radio waves and modulation of transmission data, an independent base station channel CODEC section for executing both decoding of demodulation signals from the transmitter-receiver radio circuit and coding of transmission data, a call/circuit control section for executing both voice coding of a sound signal received from a fixed network, and voice decoding of voice data which is decoded at the independent base station channel CODEC section, and for receiving a call signal from the fixed network, a home independent base station control section for executing communication protocol control among the call/circuit control section, the independent base station channel CODEC section, a power source control for the transmitter-receiver radio circuit and a mobile station, a public reception antenna for receiving radio waves which are transmitted from a public base station, a reception radio circuit for executing demodulation of received radio waves from the public reception antenna, a mobile station reception channel CODEC section for executing decoding of demodulation signals from the reception radio circuit, a public reception control section for detecting a call signal for the mobile station from decoded data from the mobile station reception channel CODEC section to notify to the home independent base station control section, and a public reception interface section which is provided within the home independent base station control section for receiving call signal detection notification from the public reception control section. The independent base station receives a call signal which is transmitted from the public base station to the mobile station during the telephone call through the independent base station. Subsequently, the mobile station receives call waiting notification signal from the independent base station. Before the mobile station disconnects the telephone call through the independent base station by manipulation of the user, it is capable of shifting to the telephone call through the public base station.

In another embodiment of the present invention, there is the independent base station which receives the call signal which is transmitted from the public base station to the mobile station during the telephone call state with the independent base station. Subsequently, the mobile station receives the call waiting notification signal from the independent base station. Before the mobile station shifts to the telephone call through the public base station, it places the original telephone call temporarily on hold through the independent base station by manipulation of the user. The on-hold state is removed after disconnection of the telephone call through the public base station, with the result that it is capable of being returned to the telephone call through the independent base station.

In another embodiment of the present invention, there is a mobile station which includes an antenna for performing transmission-reception of radio waves, a transmitter-receiver radio circuit for executing both of demodulation of received radio waves and modulation of transmission data, a mobile station channel CODEC section for executing both decoding of demodulation signal from the transmitter-receiver radio circuit and coding of the transmission data, a speaker for outputting voice audio, a microphone for inputting voice, a telephone call control section for executing both voice coding of sound signals received from the microphone and voice decoding of voice data decoded at the mobile station channel CODEC section, a mobile station control section for executing both power control of the telephone call control section, the mobile station channel CODEC section, and the transmitter-receiver radio circuit and communication protocol control, and a call waiting notification detecting section which is provided in the mobile station control section, being capable of receiving the call waiting notification signal which represents that the public base station has transmitted a call signal to the mobile station through the independent base station while the mobile station control section is communicating through the independent base station.

In further embodiment of the present invention, there is an independent base station which includes an antenna for performing transmission-reception of radio waves, a transmitter-receiver radio circuit for executing both demodulation of received radio waves and modulation of transmission data, a independent base station channel CODEC section for executing both decoding of demodulation signal from the transmitter-receiver radio circuit and coding of the transmission data, a call/circuit control section for executing voice coding of sound signals received from a fixed network, and voice decoding of voice data which is decoded at the independent base station channel CODEC section, and for receiving a call signal from the fixed network, a home independent base station control section for executing communication protocol control among the call/circuit control section, the independent base station channel CODEC section, a power source control of the transmitter-receiver radio circuit and a mobile station, a public reception antenna for receiving radio waves which are transmitted from a public base station, a reception radio circuit for executing demodulation of received radio waves from the public reception antenna, a mobile station reception channel CODEC section for executing decoding of demodulation signal from the reception radio circuit, and a public reception control section for detecting a call signal for the mobile station among the decoded data from the mobile station reception channel CODEC section to notify to the home independent base station control section, wherein when the public reception interface section receives a call signal detection notification from the public reception control section, the public base station transmits the call waiting notification signal notifying that it has caused the call signal to be transmitted to the mobile station.

In yet another embodiment of the present invention, in an independent base station the home independent base station control section, the public reception interface section, and the public reception control section constitute one block or a plurality of blocks.

In yet another embodiment of the present invention, in an independent base station, the independent base station channel CODEC section and the mobile station reception channel CODEC section constitute one block or a plurality of blocks.

In yet a further embodiment of the present invention, in an independent base station, the transmitter-receiver radio circuit and the reception radio circuit constitute one functional block or a plurality of functional blocks.

As explained above, the home independent base station of the cordless telephone system according to the present invention receives the call signal from the public base station during an indoor self-supporting telephone call in order to transmit the call waiting notification signal denoting that the accompanying control channel causes the call signal to be received. Subsequently, the dual purpose mobile station enables recognition of the incoming call from the public base station to be performed by virtue of the fact that the dual purpose mobile station receives the call waiting notification signal. More concretely, the dual purpose mobile station of the present invention comprises the antenna for performing transmission-reception of the radio waves, the transmitter-receiver radio circuit for executing both demodulation of received radio waves and modulation of transmission data, the dual purpose mobile station channel CODEC section for executing both decoding of demodulation signals from the transmitter-receiver radio circuit and coding of the transmission data, the speaker for outputting voice audio, the microphone for inputting voice audio, the telephone call control section for executing voice coding of sound signals received from the microphone and voice decoding of the voice data decoded at the dual purpose mobile station channel CODEC section, and the dual purpose mobile station control section for executing both power control and communication protocol control of the telephone call control section, the dual purpose mobile station channel CODEC section, and the transmitter-receiver radio circuit. In addition, there is provided the call waiting notification detection section which is capable of detecting the call waiting notification signal transmitted in such a way that the home independent base station transmits the notification by using accompanying control channel during indoor self-supporting telephone call.

Further, the home independent base station of the present invention comprises the antenna for performing transmission-reception of the radio waves, the transmitter-receiver radio circuit for executing demodulation of received radio waves and modulation of transmission data, the independent base station channel CODEC section for executing both decoding of demodulation signals from the transmitter-receiver radio circuit and coding of the transmission data, the call/circuit control section for executing both voice coding of sound signal received from the fixed network and voice decoding of the voice data decoded at the independent base station channel CODEC section, and for receiving the call signal transmitted from the fixed network, the home independent base station for executing both the power control among the call/circuit control section, the independent base station channel CODEC section, and the transmitter-receiver radio circuit and the communication protocol control between the mobile station and the independent base station. In addition, there is provided the public reception interface section for notifying detection of reception of the call signal transmitted from the public base station to the dual purpose mobile station by using the accompanying control channel toward the dual purpose mobile station, the public reception antenna for receiving radio waves which is transmitted from the public base station, the reception radio circuit for executing demodulation of received radio waves from the public reception antenna, the mobile station reception channel CODEC section for executing decoding of the demodulation signal from the reception radio circuit, and the public reception control section which detects the call signal for the dual purpose mobile station among the decoding data from the mobile station reception channel CODEC section to notify it to the public reception interface section. Consequently, the home independent base station receives the call signal transmitted from the public base station to the dual purpose mobile station during indoor self-supporting telephone call. The accompanying control channel enables the incoming call to be notified to the dual purpose mobile station, thus the dual purpose mobile station is capable of responding to the incoming call.

The home independent base station receives the radio waves from the public base station by the public reception antenna in order to receive the control signal from the public base station during the indoor self-supporting telephone call. The reception radio circuit demodulates the control signal which is then decoded at the channel CODEC section. The public reception control section in the home independent base station receives the call signal intermittently while deciding the reception timing of the control signal from the content of the decoded reception data. The public reception control signal notifies reception of the control signal to the home independent base station control section through the public reception interface section. Subsequently, the home independent base station control section transmits the call waiting notification signal to the dual purpose mobile station by using the accompanying control channel. The dual purpose mobile station which receives the call waiting notification signal causes the dual purpose base station control section to recognize the call waiting notification signal during indoor self-supporting telephone call. The mobile station executes its incoming processing between the public base station and the dual purpose mobile station while holding the current telephone call temporarily in order to notify the existence of the incoming call to the user. By virtue of this operation, the user can respond to the incoming call from the public station during the indoor self-supporting telephone call. When the dual purpose mobile station detects the response from the user, thus holding or disconnecting the indoor self-supporting telephone call, it can thus shift to the outdoor public telephone call. When the outdoor public telephone call ends, the dual purpose mobile station implements the disconnection processing between the public base station and the dual purpose mobile station. When the dual purpose mobile station is holding the indoor self-supporting telephone call, it can continue the indoor self-supporting telephone call by removing the hold state. When the dual purpose mobile station is in the disconnection state, it terminates the telephone call.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

The preferred embodiments of the present invention will now be described in detail referring to the accompanying drawings.

Figure 1:
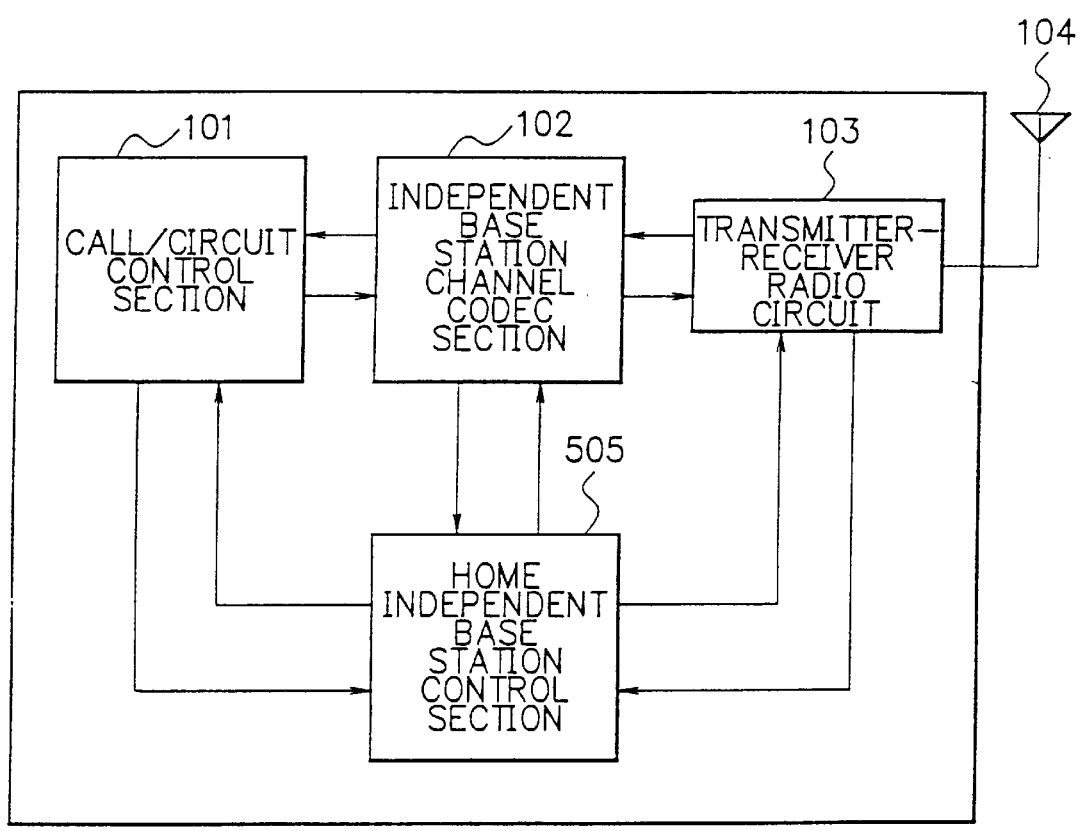
FIG. 1 is a view showing a functional block configuration of the conventional home independent base station.
Figure 2:
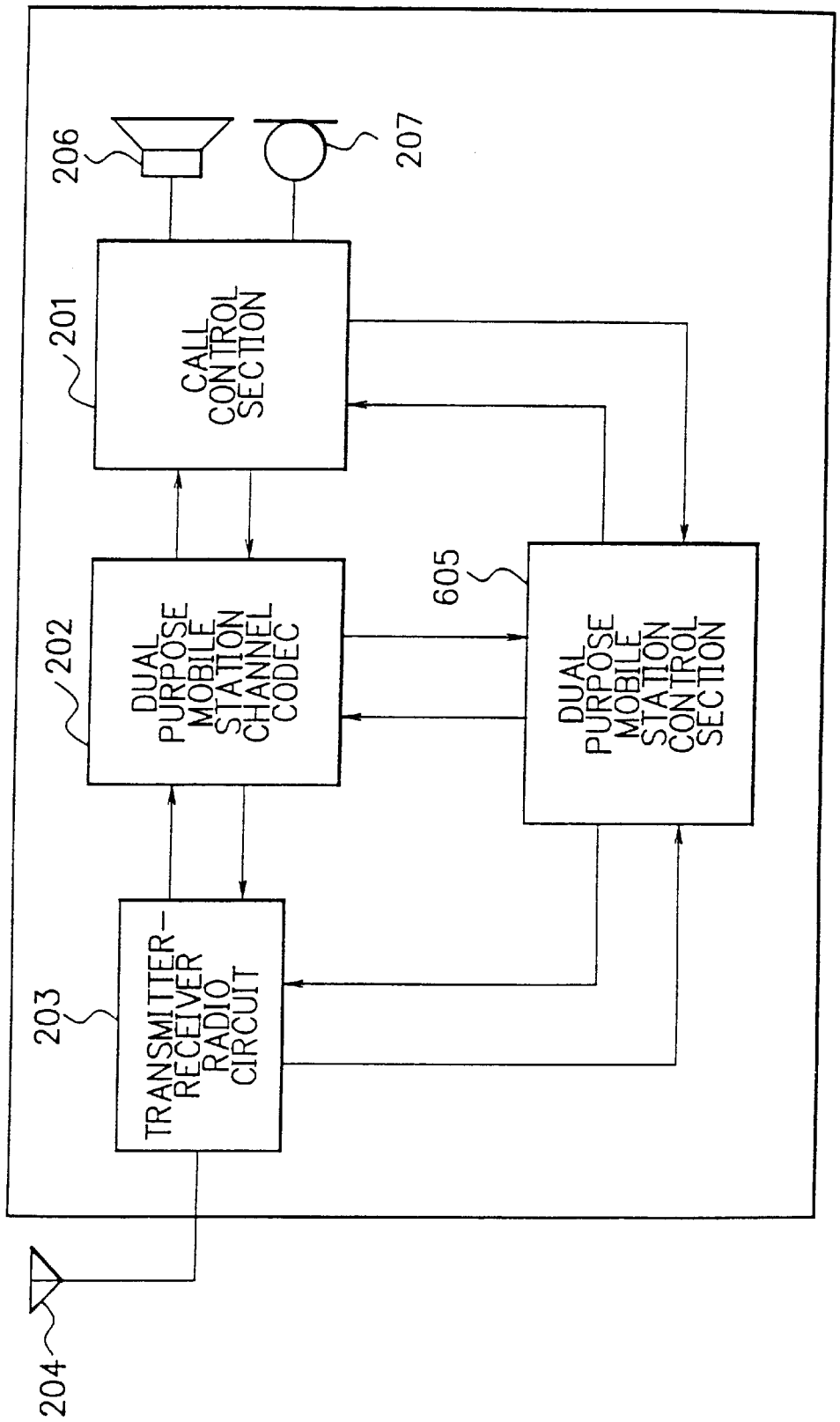
FIG. 2 is a view showing a functional block configuration of the conventional dual purpose mobile station.
Figure 3:
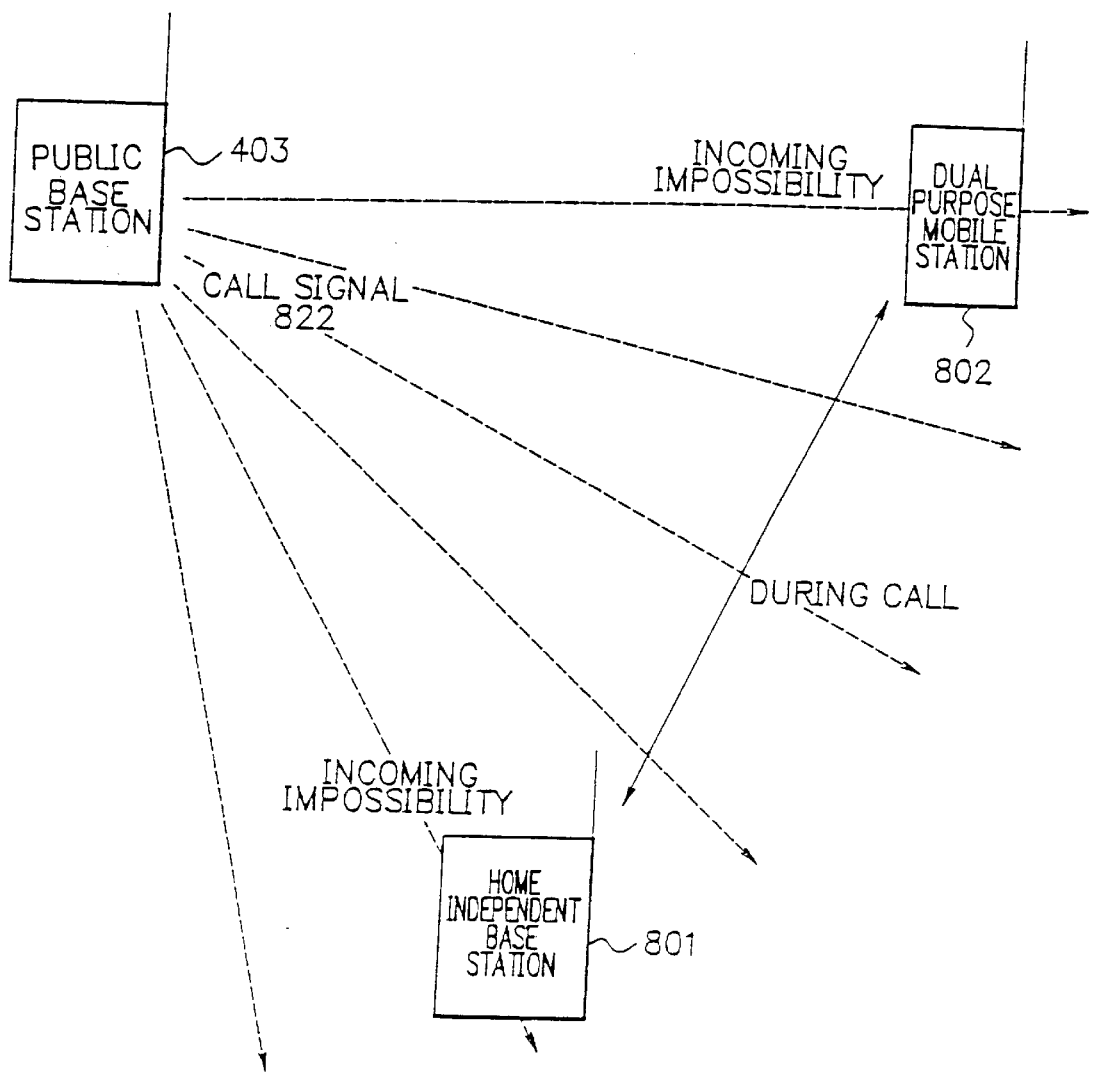
FIG. 3 is a view showing operation environment of the conventional cordless telephone system.
Figure 4:
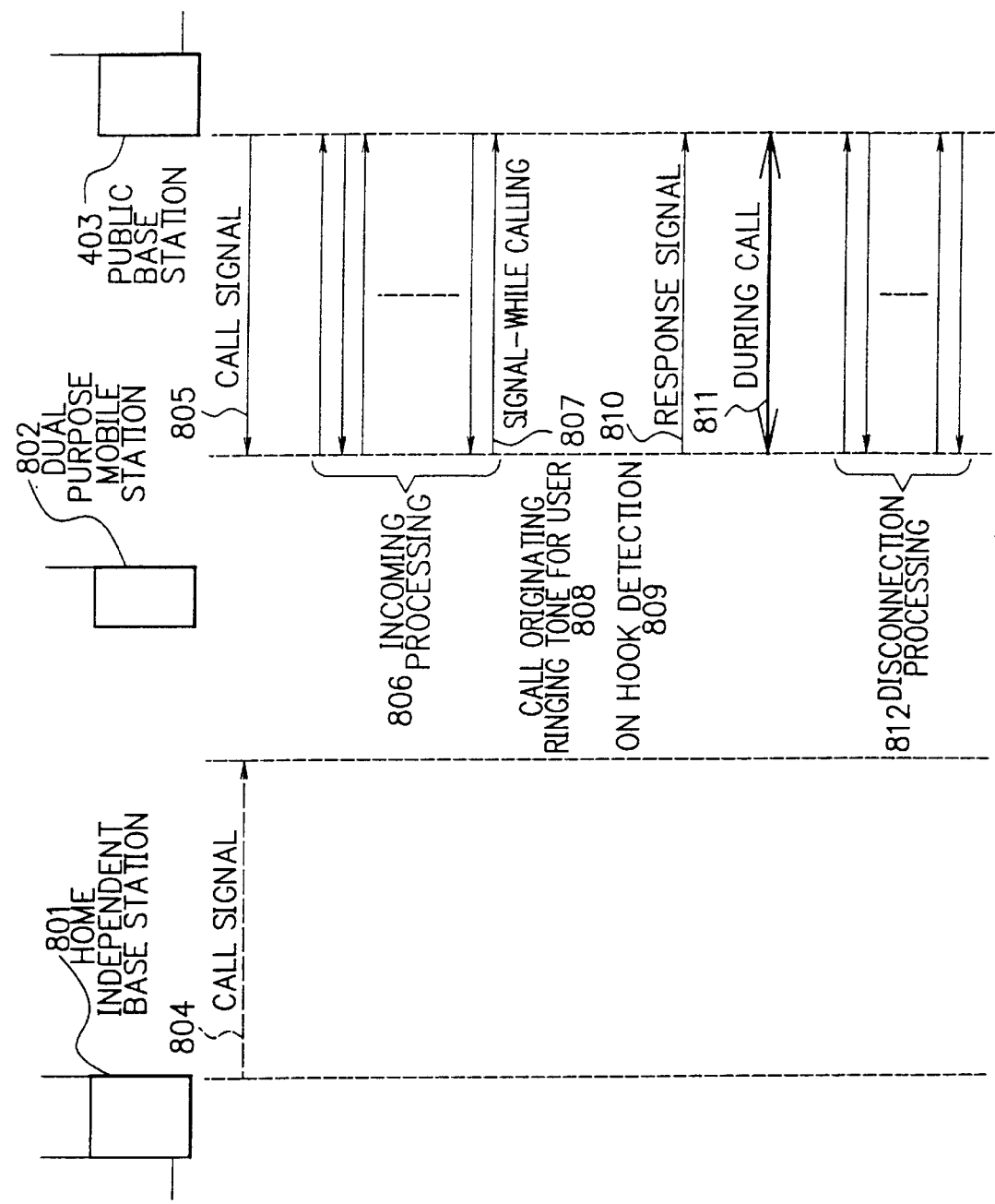
FIG. 4 is a sequence chart showing the operation when a call signal from both of the home independent base station and the public base station is transmitted simultaneously to the dual purpose mobile station in the conventional cordless telephone system.
Figure 5:
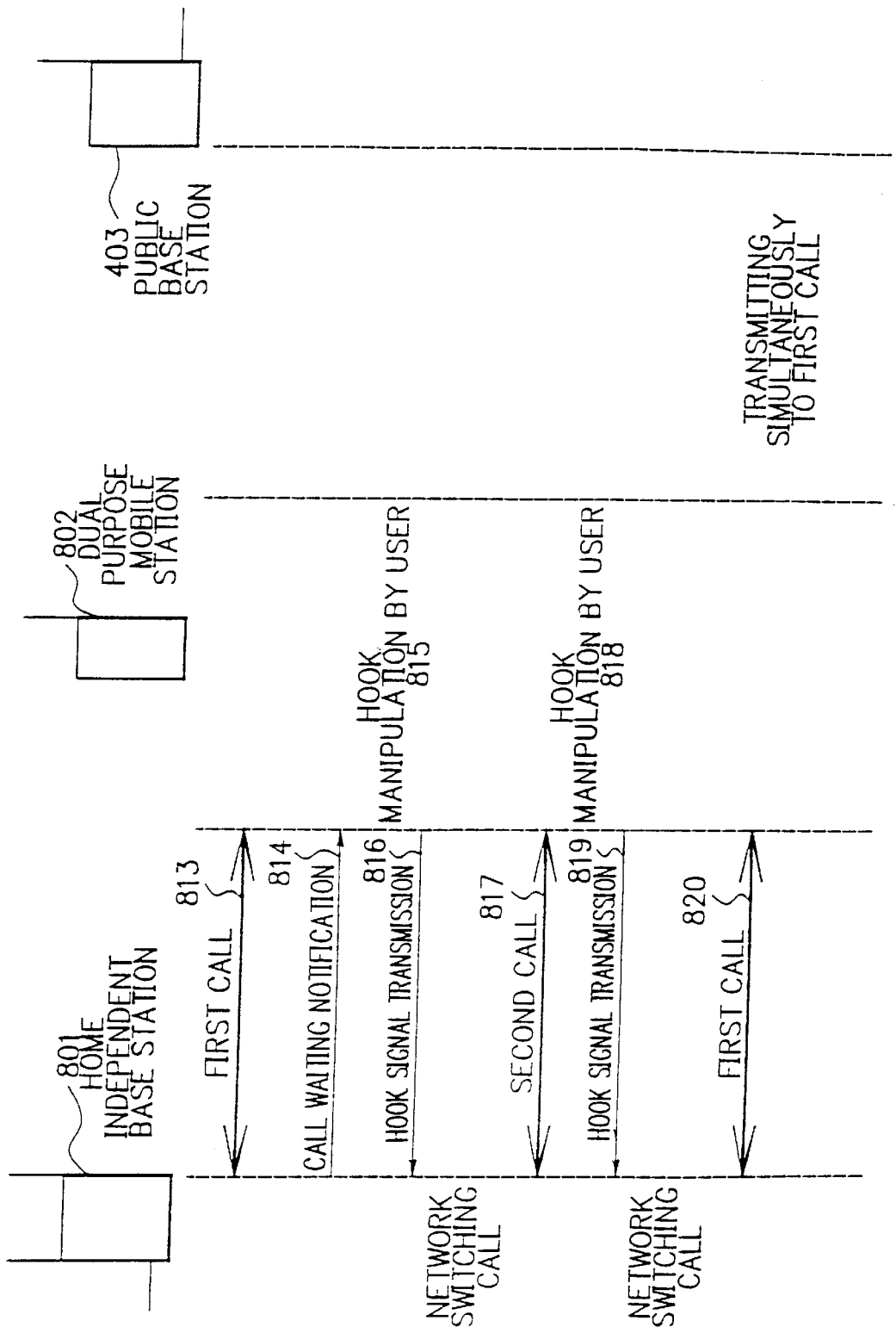
FIG. 5 is a sequence chart showing the operation when the dual purpose mobile station receives a call waiting notification signal from the home independent base station during indoor self-supporting telephone call in the conventional cordless telephone system.
Figure 6:
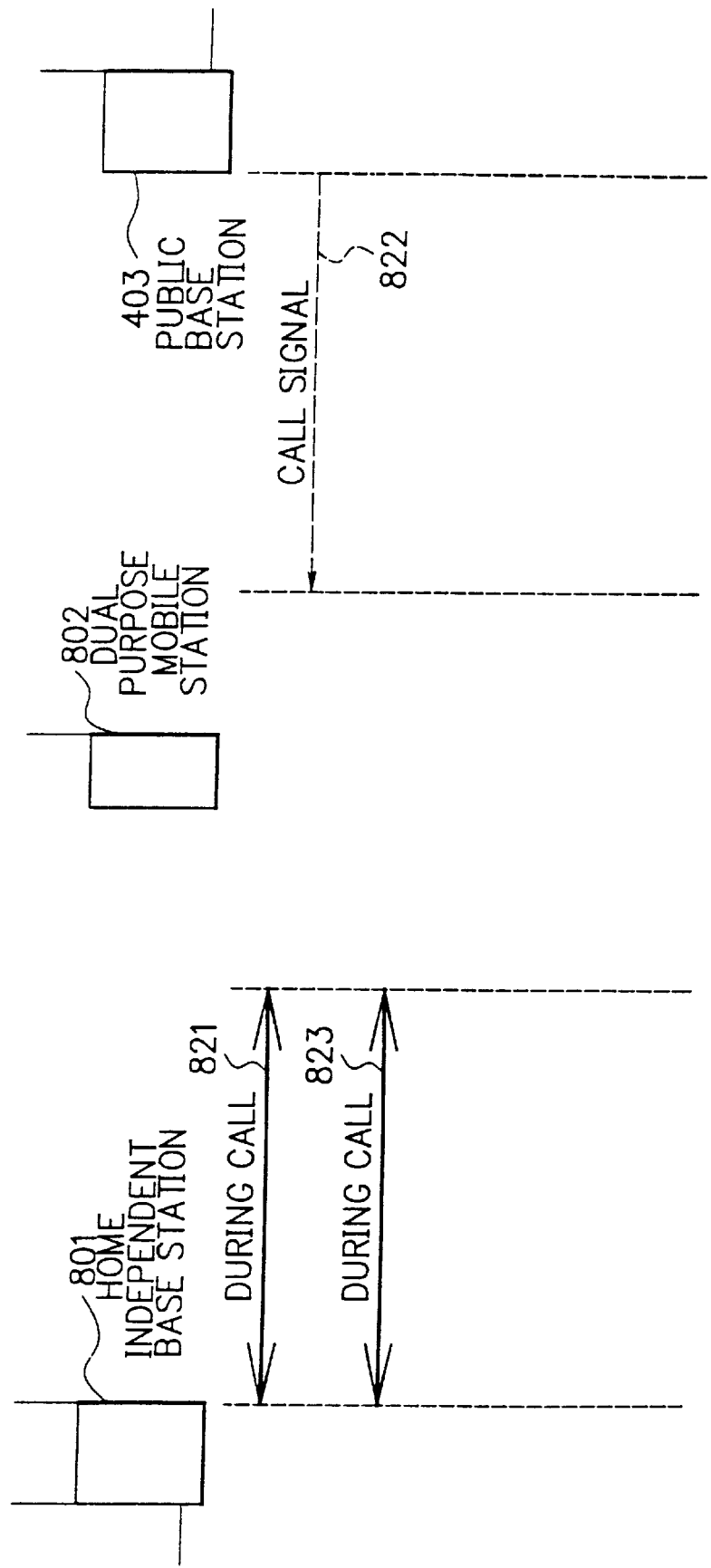
FIG. 6 is a sequence chart showing the operation when the public base station transmits a call signal to the dual purpose mobile station during self-supporting telephone call in the conventional cordless telephone system.
Figure 7:
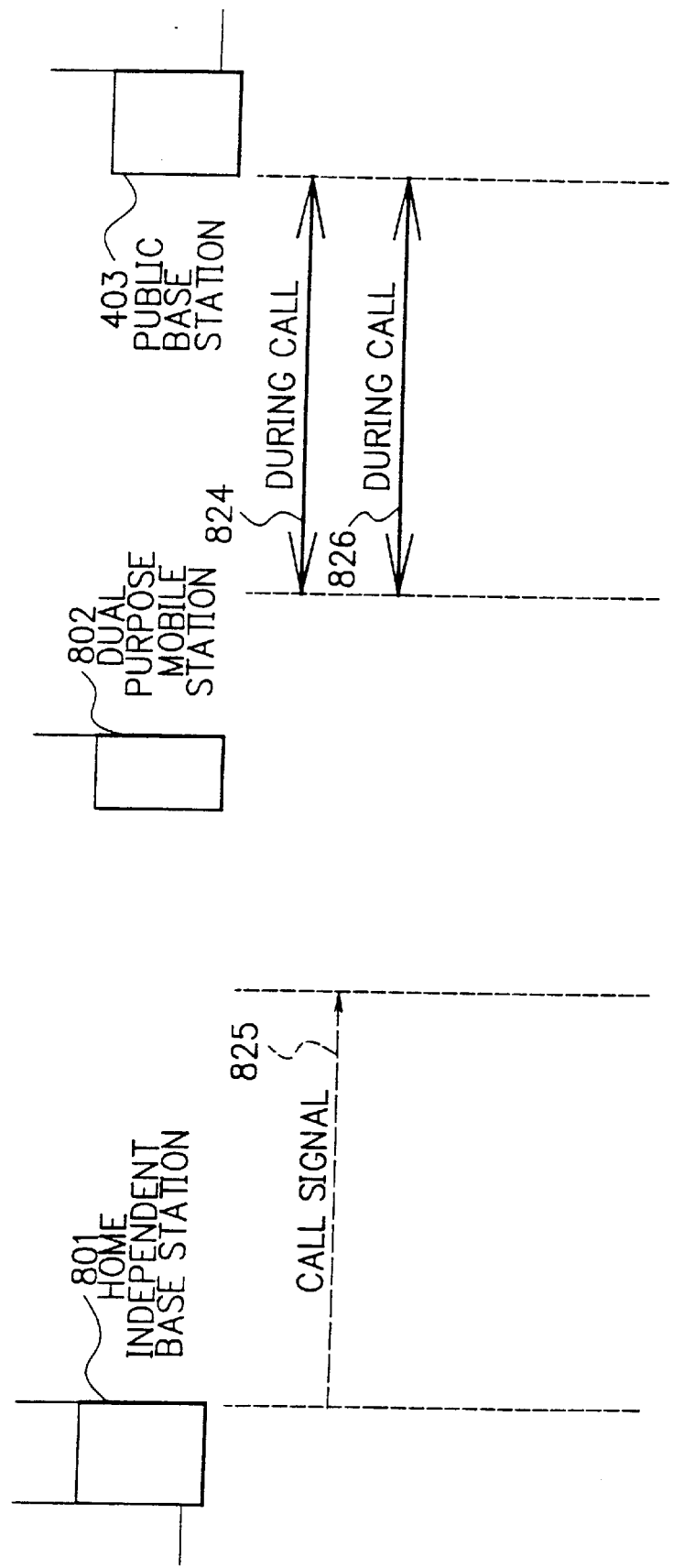
FIG. 7 is a sequence chart showing the operation when the home independent base station transmits a call signal to the dual purpose mobile station during a public telephone call in the conventional cordless telephone system.
Figure 8:
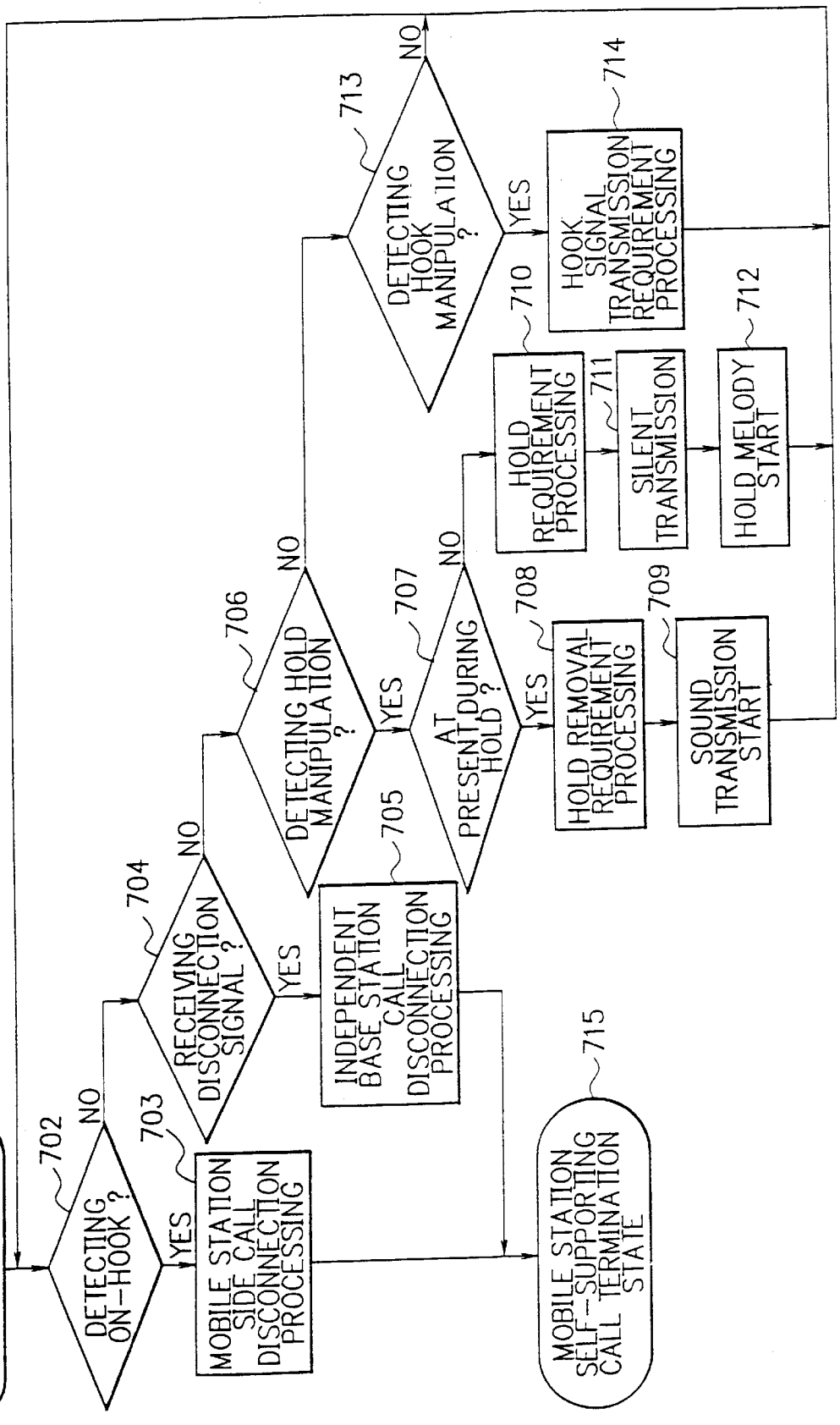
FIG. 8 is a flow chart showing the operation at the time of a indoor self-supporting telephone call of the conventional dual purpose mobile station control section.
Figure 9:
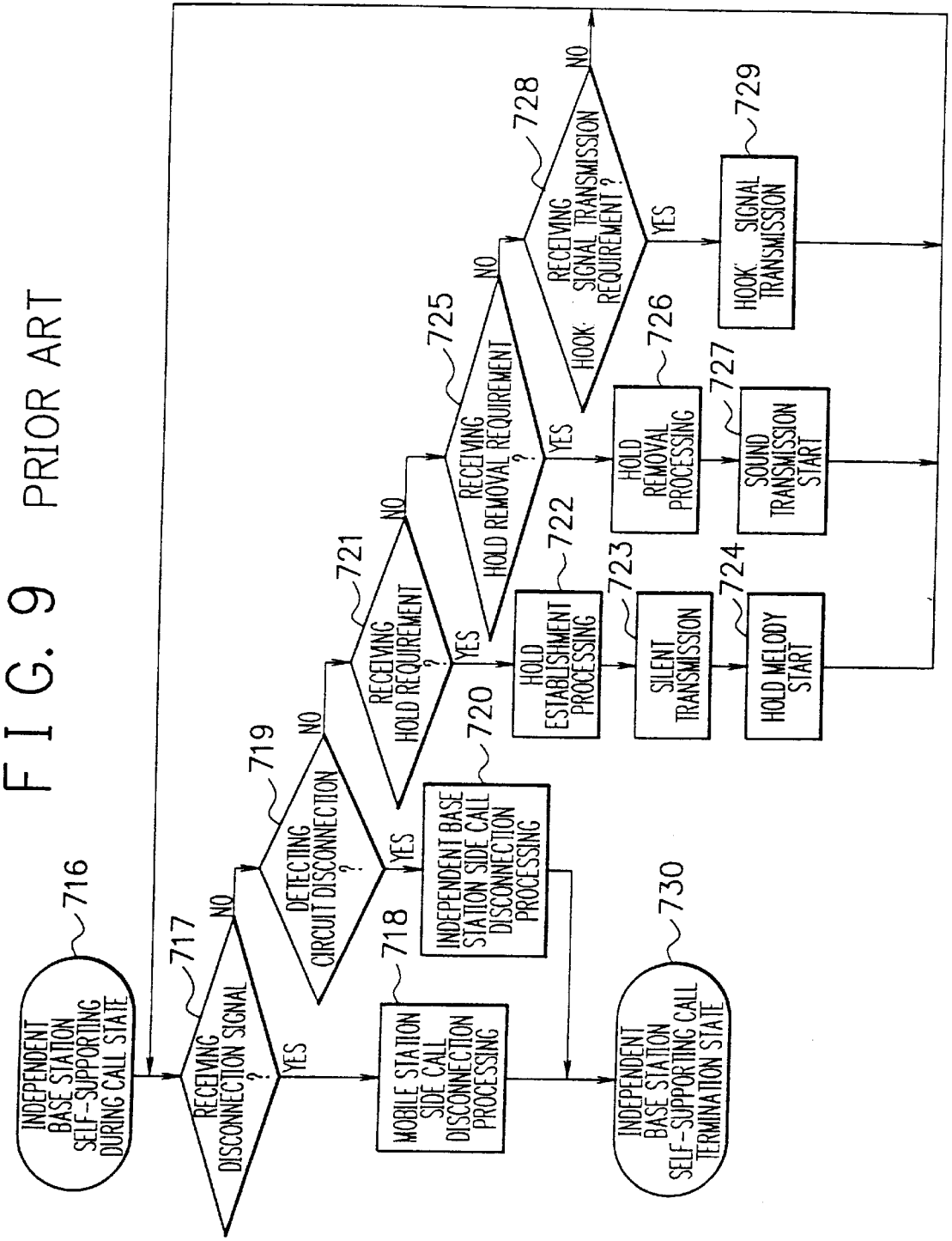
FIG. 9 is a flow chart showing the operation at the time of a indoor self-supporting telephone call of the conventional home independent base station control section.
Figure 10:
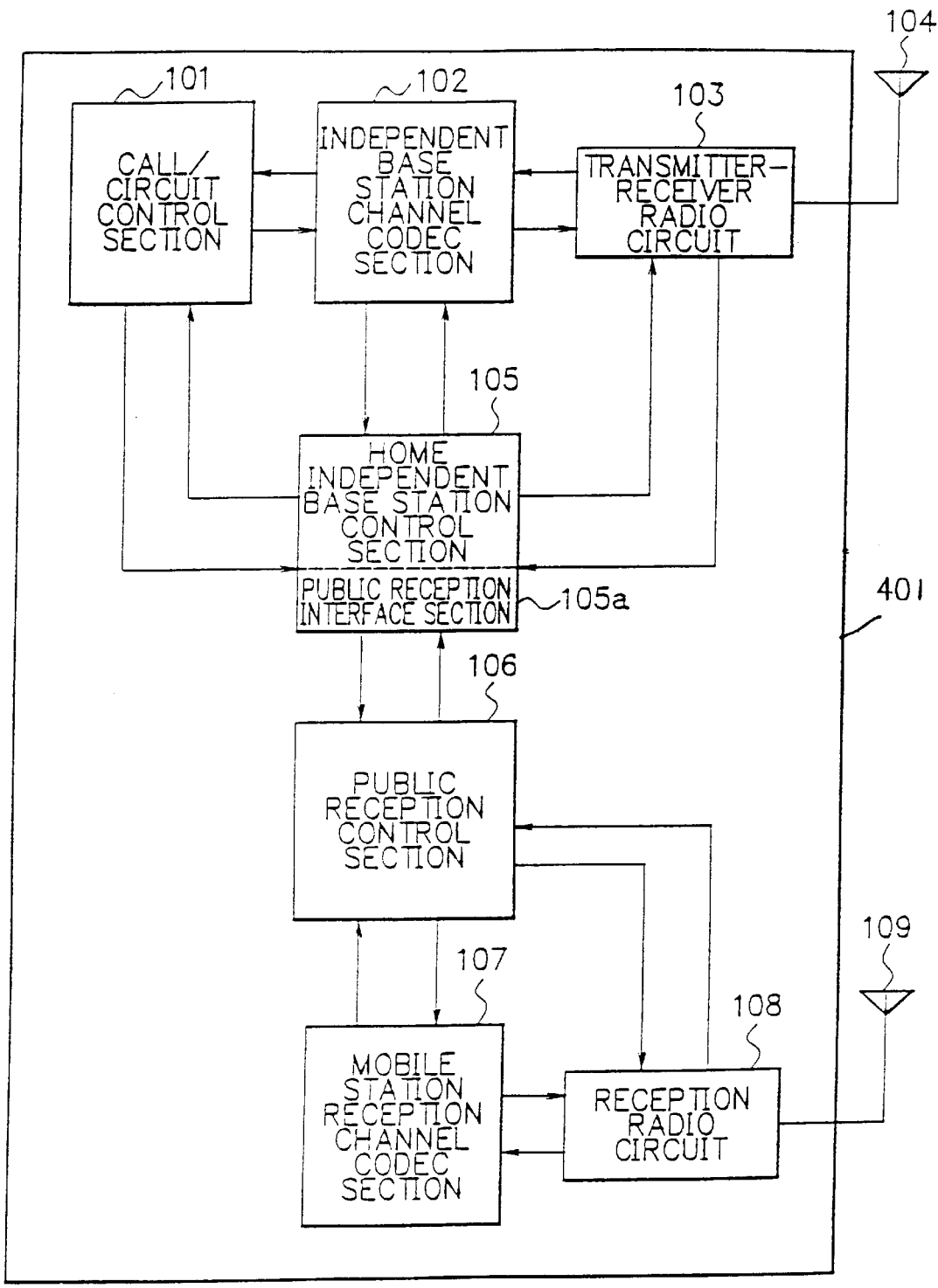
FIG. 10 is a view showing functional block configuration of a home independent base station according to the present invention.

FIG. 10 is a block diagram showing a configuration of a cordless telephone system according to the present invention. A home independent base station 401 of the present invention comprises an antenna 104 for performing transmission-reception of radio wave, a transmitter-receiver radio circuit 103 for executing both demodulation of reception radio waves, and modulation of transmission data, a independent base station channel CODEC section 102 for executing both decoding of demodulation signals from the transmitter-receiver radio circuit 103, and coding of transmission data, a call/circuit control section 101 for executing both voice coding of received sound signals from fixed network, and voice encoding of demodulated voice data from the independent base station channel CODEC section 102, and for receiving a call signal from the fixed network, a home independent base station control section 105 for executing power control among the call/circuit control section 101, the independent base station channel CODEC section 102, and the transmitter-receiver radio circuit 103, and for executing communication protocol control between the independent base station control section 105 and the mobile station 402. In addition, there is provided a public reception interface section 105a which notifies reception of the call signal to the dual purpose mobile station 402 from the public base station 403 in such a way that the public reception interface section 105a notifies it using an accompanying control channel, a public reception antenna 109 for receiving radio waves transmitted from the public base station 403, a reception radio circuit 108 for executing demodulation of radio waves received from the public reception antenna 109, a mobile station reception channel CODEC section 107 for executing decoding of demodulation signals from the reception radio circuit 108, and a public reception control section 106 for detecting a call signal of the dual purpose mobile station 402 from among the decoded data from the mobile station reception channel CODEC section 107 in order to notify the public reception interface section 105a.

Figure 11:
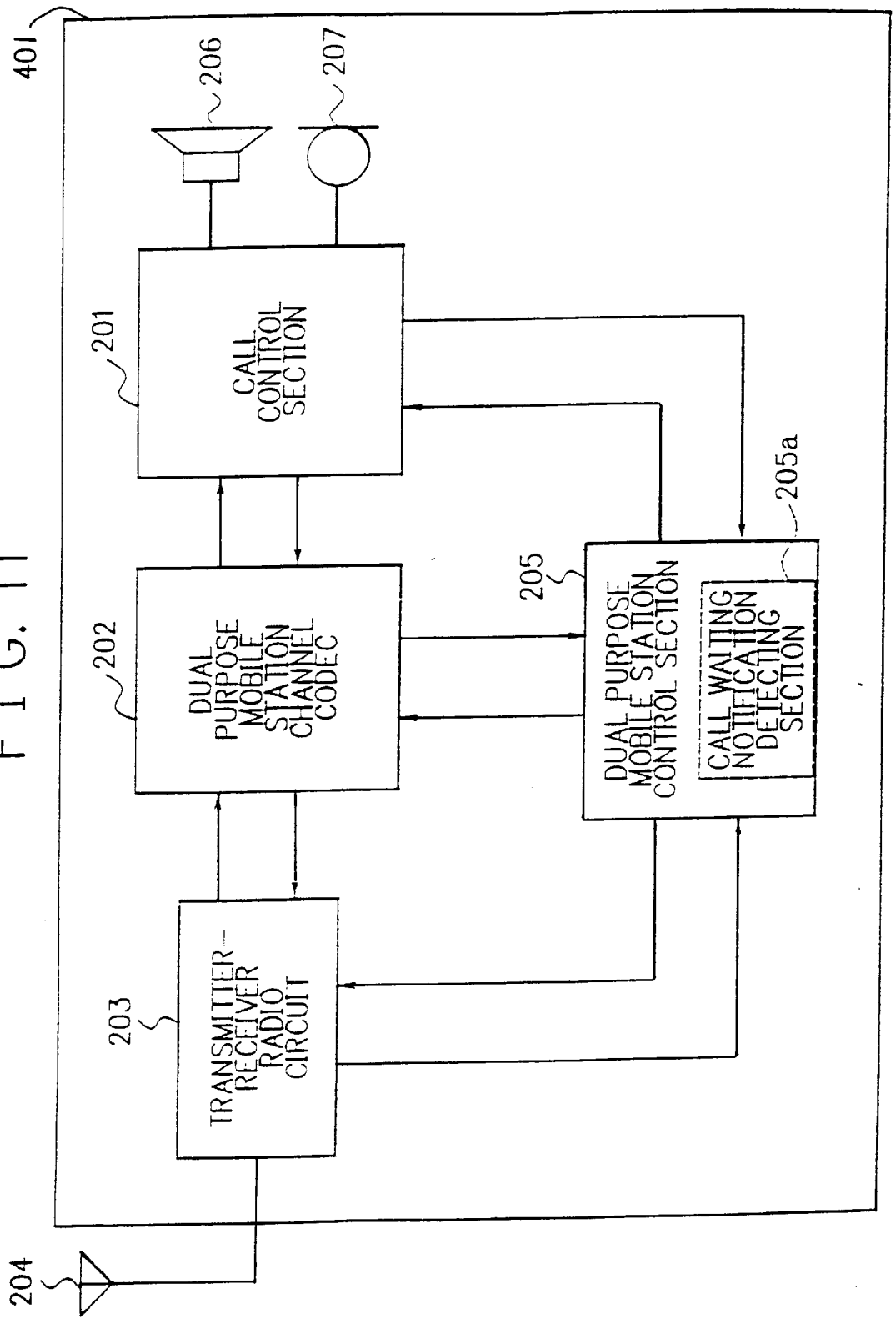
FIG. 11 is a view showing functional block configuration of a dual purpose mobile station according to the present invention.

Next, FIG. 11 is a block diagram showing the internal configuration of the dual purpose mobile station 402 of the present invention. The dual purpose mobile station 402 of the present invention comprises an antenna 204 for performing transmission-reception of radio waves, a transmitter-receiver radio circuit 203 for executing both of demodulation of received radio waves and modulation of transmission data, a dual purpose mobile station channel CODEC section 202 for executing both decoding of demodulation signals from the transmitter-receiver radio circuit 203 and coding of transmission data, a speaker 206 for outputting voice audio, a microphone 207 for inputting voice audio, a telephone call control section 201 for executing both voice coding of sound signals received from the microphone 207 and voice decoding of voice data decoded at the dual purpose mobile station channel CODEC section 202, a dual purpose mobile station control section 205 for executing power control among the telephone call control section 201, the dual purpose mobile station channel CODEC section 202, and the transmitter-receiver radio circuit 203, and for executing communication protocol control between the dual purpose mobile station control section and the home independent base station 401 or between the public base station 403 and the same. In addition, there is provided a call waiting notification detecting section 205a which is capable of detecting notification that a call signal has been transmitted to the dual purpose mobile station 402 from the public base station 403 during a indoor self-supporting telephone call by means of accompanying control channel.

Figure 12:
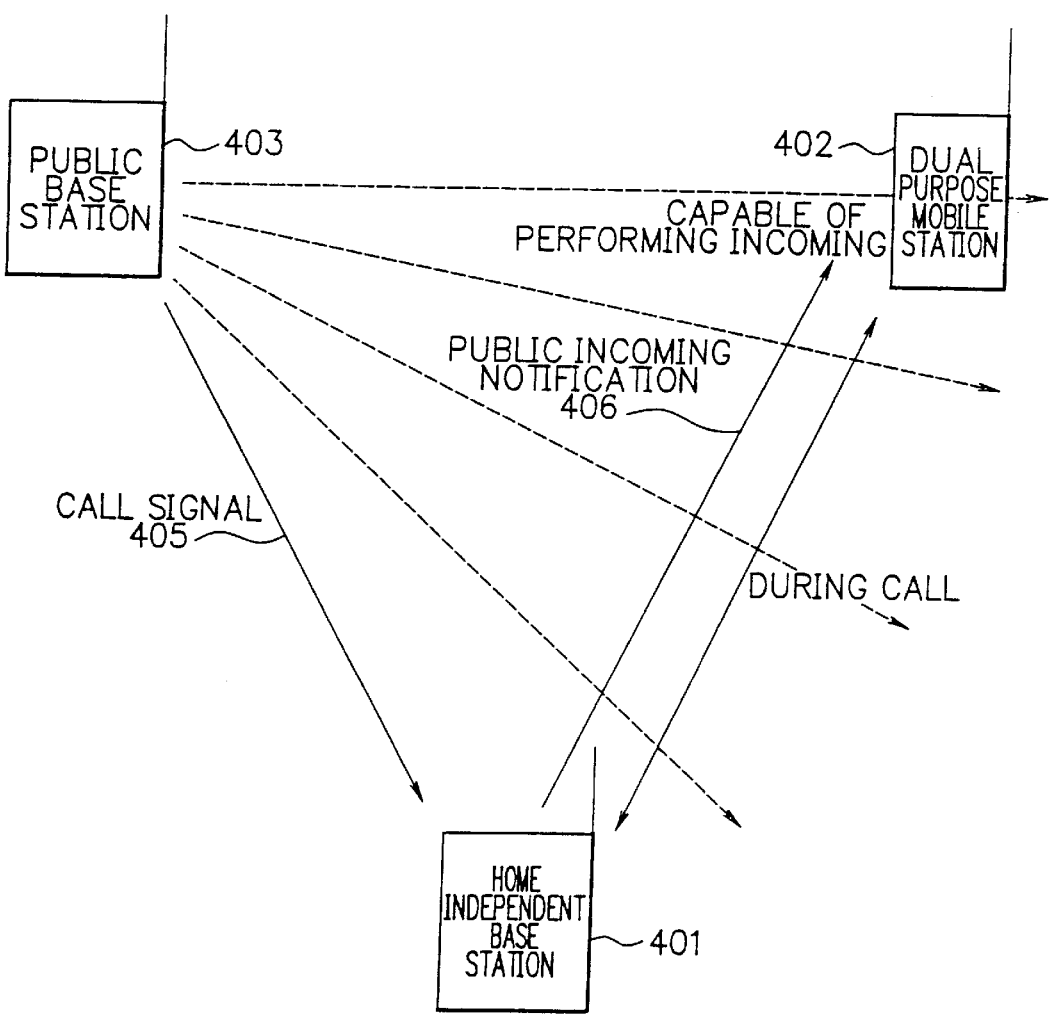
FIG. 12 is a block diagram showing the operational environment of the cordless telephone system according to the present invention.

FIG. 12 is a block diagram showing an operational environment of the cordless telephone system of the present invention. The dual purpose mobile station 402 is capable of executing the telephone call through the home independent base station 401. The dual purpose mobile station 402 is further capable of receiving radio waves from the public base station 403. When the dual purpose mobile station 402 is in a telephone call state through the home independent base station 401, the dual purpose mobile station 402 is incapable of receiving radio waves from the public base station 403. However, the home independent base station 401 receives radio waves from the public base station 403 instead of the dual purpose mobile station 402. The home independent base station 401 then causes received radio waves at the public reception antenna 109 to be demodulated by means of the reception radio circuit 108, decoding the received signal by means of the mobile station channel CODEC section 107, detecting the call signal by means of the public reception control section 106, and notifying the reception to the home independent base station control section 105 through public reception interface section 105a. The home independent base station 401 then transmits the call waiting notification signal 406 to the dual purpose mobile station 402 using a accompanying control channel. Thus the dual purpose mobile station 402 receives the call waiting notification signal. As a result thereof, the dual purpose mobile station 402 is capable of receiving the call signal from the public base station 403.

Next, a first embodiment of the invention will be described referring to drawings.

Figure 13:
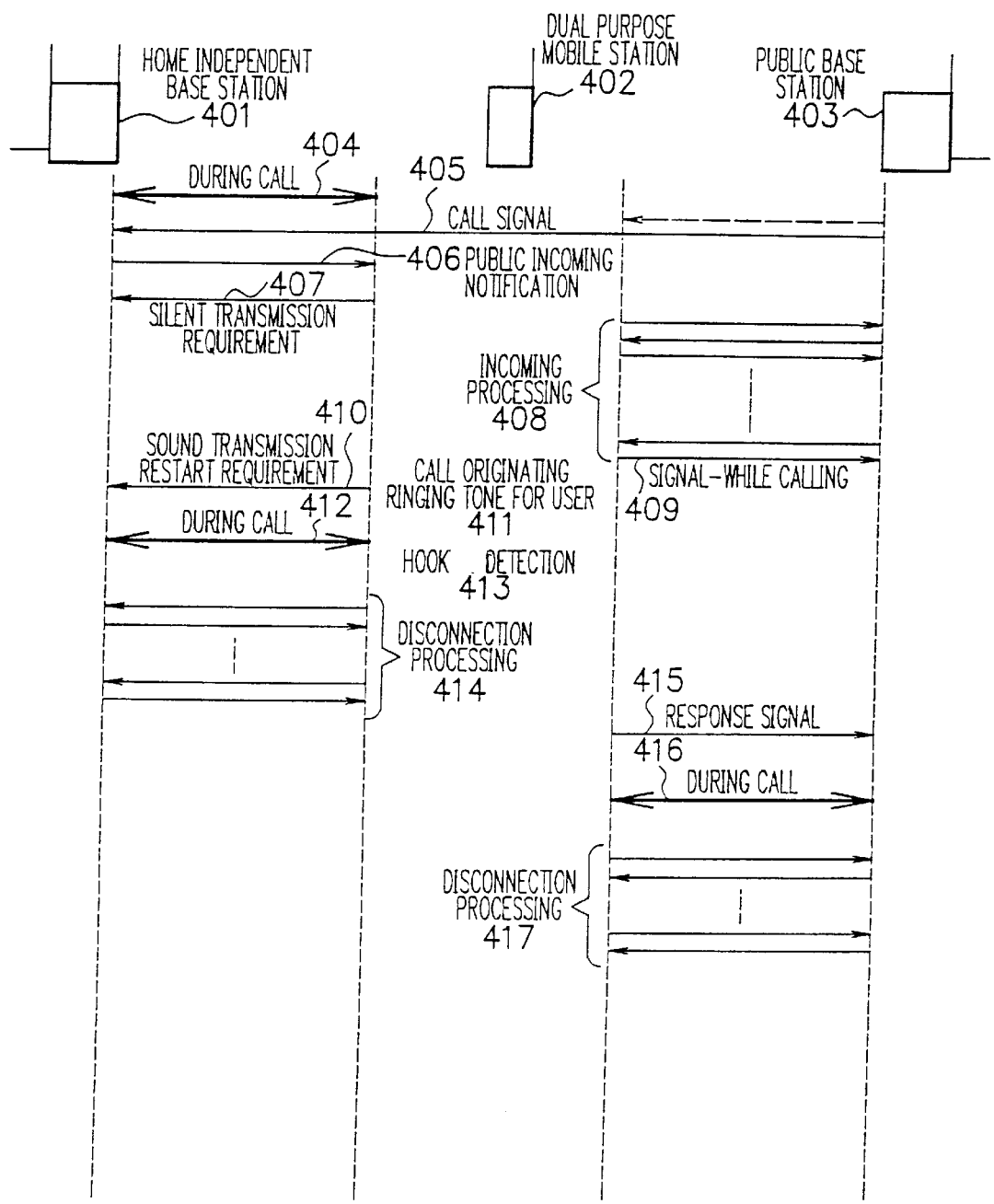
FIG. 13 is a flow chart showing the operation when a call signal is transmitted from the public base station during a self-supporting telephone call in a first embodiment of the cordless telephone system according to the present invention.

FIG. 13 is an operational sequence diagram showing the first embodiment of the invention. When the public base station 403 transmits call signal 405 to the dual purpose mobile station during a telephone call 404 currently occurring between the home independent base station 401 and the dual purpose mobile station 402, the home independent base station 401 receives the call signal 405 and transmits the public reception notification 406 to the dual purpose mobile station using an accompanying control channel. There are two systems in the accompanying control channel. One system is capable of transmitting control information without breaking voice communication, and another system is capable of transmitting control information with breaking voice communication. The present embodiment uses the system in which the control information is transmitted without breaking the voice communication. When the dual purpose mobile station 402 receives the control information, it executes its incoming processing 408 while stopping the telephone call 404 temporarily. The mobile station 402 transmits a silent transmission requirement to the home base station 401 (407) in order to cause the home independent base station 401 to perform silent transmission. Subsequently, the dual purpose mobile station 402 stops the telephone call 404 to implement the incoming processing 408. At the end of the incoming processing 408, the dual purpose mobile station 402 transmits a during-telephone call signal (409) to the public station 403 for notifying that calling of user is in progress. In order to return to the telephone call between the dual purpose mobile station 402 and the home independent base station, the dual purpose mobile station stops the silent transmission to the fixed network. The dual purpose mobile station 402 returns to the telephone call (412) by transmitting a voice transmission restart requirement (410) for transmitting a sound signal, and simultaneously transmits (411) a ringing tone to notify reception of signal to the user. When the dual purpose mobile station 402 detects response from the user, namely detects hooking (413), it executes its disconnection processing (414) for disconnecting the indoor self-supporting telephone call. When disconnection is completed, the dual purpose mobile station 402 shifts therefrom to the telephone call 416 by transmitting a response signal 415 to the public base station. When the telephone call ends, the dual purpose mobile station returns to the state of receive-queuing while executing its disconnection processing 417.

Figure 15:
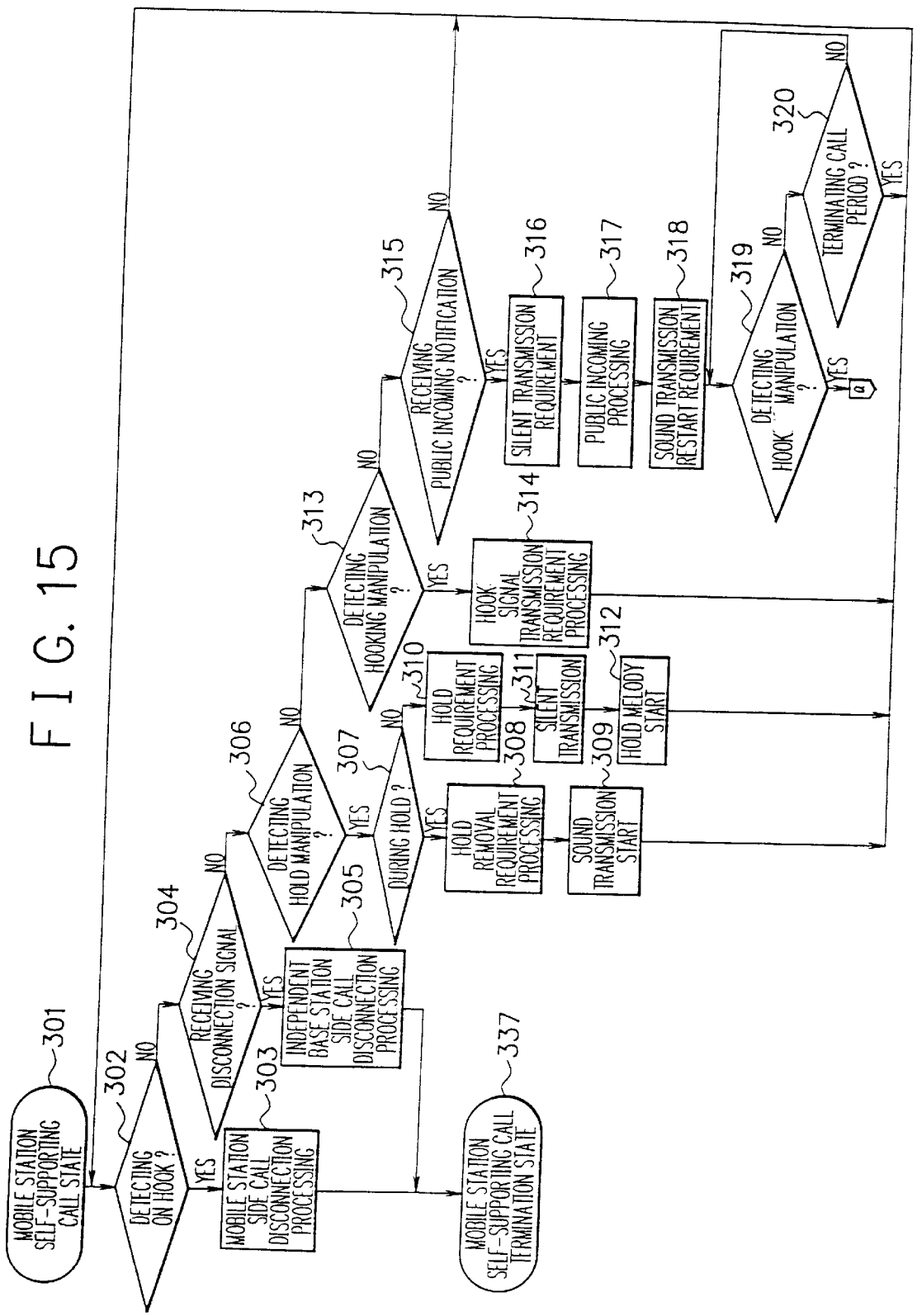
FIG. 15 is a flow chart showing the operation at the time of a indoor self-supporting telephone call of the dual purpose mobile station control section according to the present invention.
Figure 16:
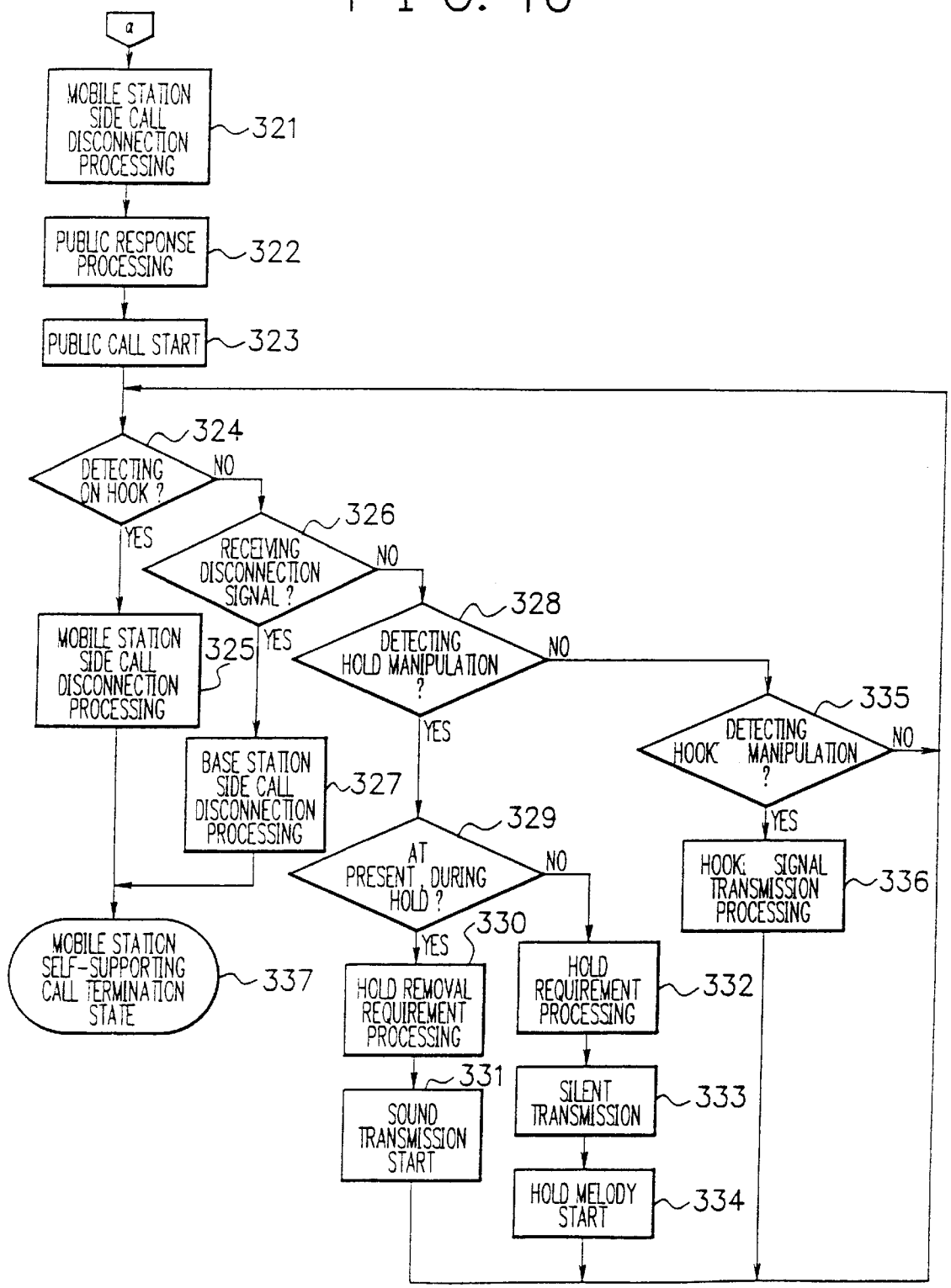
FIG. 16 is a flow chart showing the operation when switching from an indoor self-supporting telephone call of the dual purpose mobile station control section to an outdoor public telephone call according to a first embodiment of the present invention.
Figure 17:
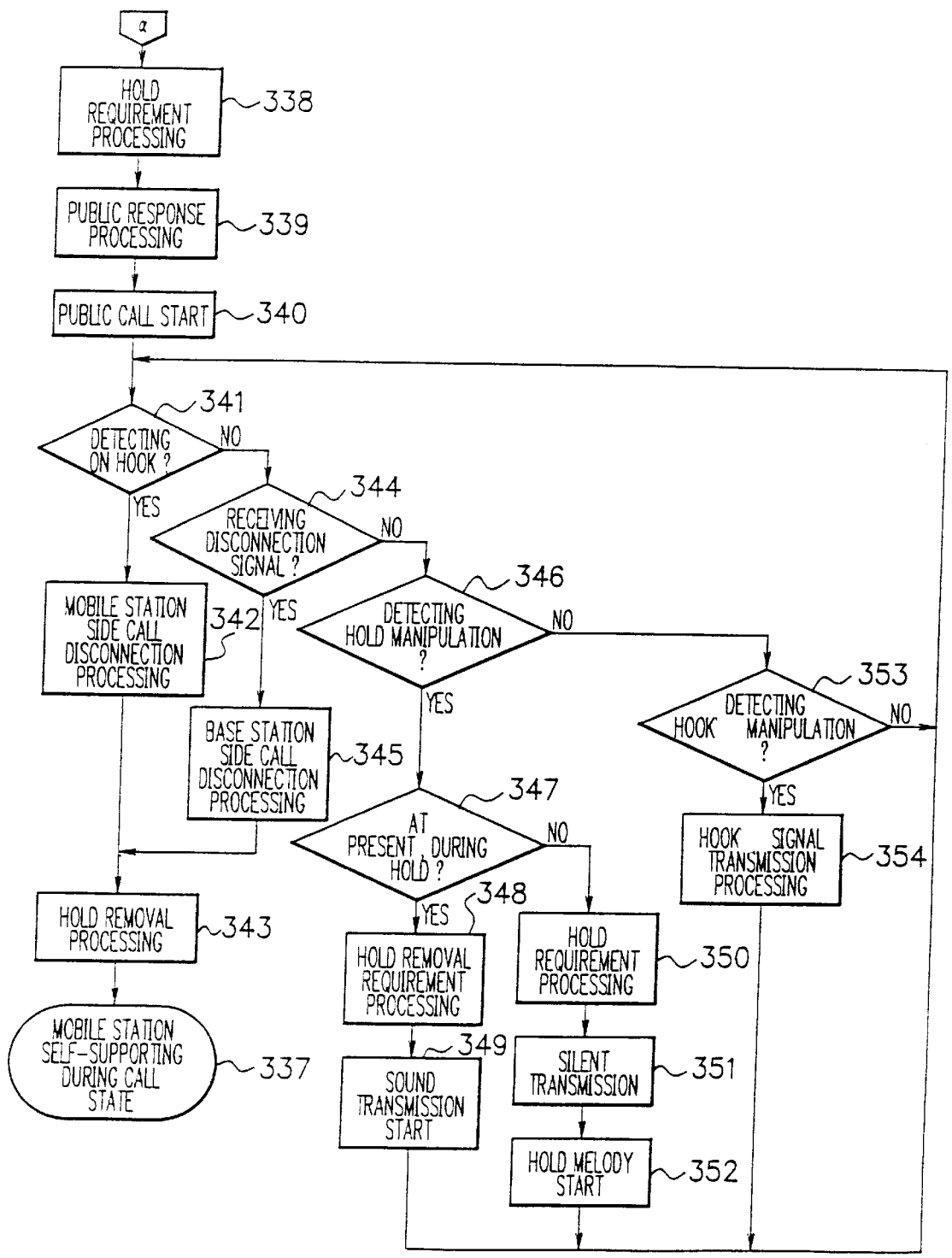
FIG. 17 is a flow chart showing the operation when switching from indoor self-supporting telephone call of the dual purpose mobile station control section to an outdoor public telephone call according to a second embodiment of the present invention.

FIGS. 15, 16 and 17 are flow charts showing operation of the dual purpose mobile station according to the first embodiment of the present invention. Turning to FIG. 15, when the dual purpose mobile station control section 205 detects on-hook 302 during a indoor self-supporting telephone call 301, the dual purpose mobile station proceeds to a telephone call end state by executing telephone call disconnection processing 303 which is actuated from the side of mobile station 402. When the dual purpose mobile station control section does not detect on-hook 302 and receives a disconnection signal 304 from the home independent base station 401 the dual purpose mobile station also proceeds to the telephone call end state 337 by executing telephone call disconnection processing 305 which is actuated from the independent base station 401. When the dual purpose mobile station control section 205 does not receive 304 a disconnect signal from the home independent base station 401, but detects a hold-manipulation by the user 306, and if the indoor self-supporting telephone call is already in a hold state 307, it causes transmission of sound signals to be resumed 309 after executing processing 308 to remove the holding of the indoor self-supporting telephone call. When the dual purpose mobile station control section 205 does not receive 304 a disconnection signal from the home independent base station 401, but detects a hold-manipulation by the user 306, and if the indoor self-supporting telephone call is not on hold 307, it causes silent transmission to be executed 311 after executing hold transmission requirement processing 310 to cause the hold of the indoor self-supporting telephone call. The dual purpose mobile station 402 then rings a hold-melody for notifying the during-hold to the user 312. When the dual purpose mobile station control section 205 does not detect the hold manipulation by the user 306 but detects hook manipulation by the user 313, it executes transmission requirement processing 314 of the hooking signal to the home independent base station 401. When the dual purpose mobile station control section 205 does not detect the hooking manipulation by the user (313), but receives 315 a public incoming notification from the home independent base station 401, it transmits a silent transmission requirement 316 to the home independent base station 401. The dual purpose mobile station control section 205 implements the incoming processing 317 with respect to the public base station 403 before transmitting a voice transmission restart requirement 318 to the home independent base station 401. At this time, if the dual purpose mobile station 402 detects the hook manipulation 319, switching of telephone call is executed (reference number continues to FIG. 16). If the dual purpose mobile station 402 does not detect the hook manipulation 319, it continues to monitor the hook manipulation until ending of a calling period (320). When the calling period ends, the dual purpose mobile station 402 resumes the indoor self-supporting telephone call. Further, if the dual purpose mobile station does not receive 315 the public incoming notification from the home in dependent base station 401, the indoor self-supporting telephone call is maintained.

Next, the operation (telephone call switching operation) after α of FIG. 15 will be explained with respect to FIG. 16. In the first embodiment, the telephone call disconnection processing 321 which is actuated from the side of the mobile station 402 is executed. The public telephone call is started 323 after executing the public response processing 322 in which the response from the user is notified to the public base station 403. During the public telephone call, if the on-hook is detected 324, the telephone call disconnection processing 325 is executed which is actuated from the mobile station 402, and the process proceeds to the telephone call end state 337. If the disconnection signal is received 326 from the home independent base station 401 without detecting the on-hook, the telephone call disconnection processing is executed 327 which is actuated from the home independent base station 401, and the process proceeds to the telephone call end state 337. When the dual purpose mobile station 402 does not receive 326 a disconnection signal from the home independent base station 402, but detects hold-manipulation by the user 328, and if the indoor self-supporting telephone call is already in the hold state 329, transmission of sound signal is resumed 331 after executing processing 332 to remove the hold of the indoor self-supporting telephone call. If the dual purpose mobile station 402 is not holding an indoor self-supporting telephone call 329, processing of the hold of the indoor self-supporting telephone call is executed 332, causing silent transmission 333, and ringing a hold-melody for notifying the user of the hold 334. If the dual purpose mobile station 402 does not detect the hold-manipulation by the user, but detects a hooking operation (335), a hooking signal is transmitted 336 to the public base station 403. If the dual purpose mobile station 402 does not detect the hook manipulation, the outdoor public telephone call is maintained.

Next, the second embodiment of the invention will be described with respect to FIG. 14.

Figure 14:
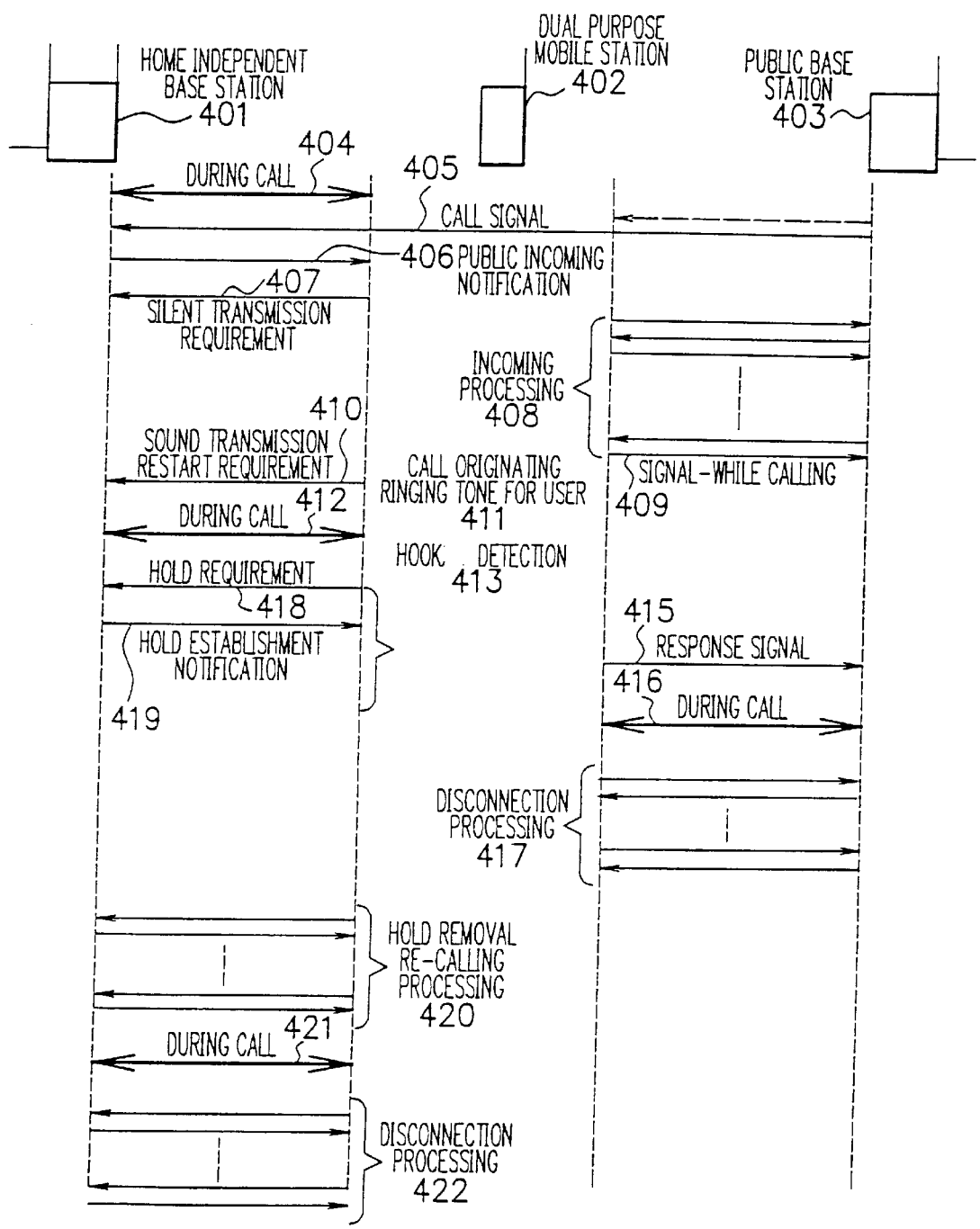
FIG. 14 is a flow chart showing the operation when a call signal is transmitted from the public base station during a self-supporting telephone call in a second embodiment of the cordless telephone system according to the present invention.

FIG. 14 is operational sequence diagram showing operation of the second embodiment of the present invention. During telephone call 404 between the home independent base station 401 and the dual purpose mobile station 402, when the public base station 403 transmits call signal (405) to the dual purpose mobile station, the home independent base station receives the call signal 405 in order to transmit the public incoming notification 406 to the dual purpose mobile station using accompanying control channel. When the dual purpose mobile station receives the notification 406, it transmits a silent transmission requirement 407 to the home independent base station 401 in order to execute silent transmission while temporarily stopping the telephone call 404. Subsequently, the dual purpose mobile station 402 executes the incoming processing 408. At the end of the incoming processing 408, the dual purpose mobile station 402 transmits the during-call signal 409 notifying the public station 403 that the telephone call 404 is in progress. In order to return to the telephone call between the home independent base station 401 and the dual purpose mobile station 402, the dual purpose mobile station 402 stops silent transmission to the fixed network, thus returning to the telephone call 412 by transmitting the voice transmission restart requirement 410 in order to transmit the sound signal. Simultaneously, the dual purpose mobile station 402 transmits the ringing tone for notifying the user 411 of the incoming call. If the user's response namely hooking 413 is detected, the hold-requirement 418 is transmitted to the home independent base station 401 to hold the indoor self-supporting telephone call. The dual purpose mobile station 402 shifts to the new telephone call 416 after being notified of the setting of the hold state 419 from the home independent base station 401. When the telephone call 416 is terminated, the disconnection processing 417 is executed. Further, in order to return to the indoor self-supporting telephone call again while removing the hold, the dual purpose mobile station 402 executes hold-removing recall out processing 420 to resume the indoor self-supporting telephone call (421). When the telephone call is terminated, the dual purpose mobile station 402 executes disconnection processing 422 to return to the state of the incoming queuing.

FIGS. 15 and 17 are flow chart diagram showing operation of the dual purpose mobile station control section 205 according to the second embodiment of the present invention. The operation of the dual purpose mobile station control section 205 depicted in FIG. 15 and described above with respect to the first embodiment is the same operation performed in the second embodiment and shall not be reiterated.

The operation (telephone call switching operation) after α of FIG. 15 will be described with respect to FIG. 17. In the second embodiment, in order to perform holding of the indoor self-supporting telephone call, the dual purpose mobile station 402 executes hold requirement processing 338 to the home independent base station 401, and executes incoming processing 339 to the public base station 403, before starting the public telephone call 340. During the public telephone call, if the on-hook is detected 341, the dual purpose mobile station 402 executes the telephone call disconnection processing 342 which is actuated from the mobile station 402. The dual purpose mobile station 402 returns to the indoor self-supporting telephone during call state 337 after executing hold removal re-call out processing 343 for resuming the telephone call by removing the hold. If the dual purpose mobile station 402 does not detect the on-hook 341, but receives 344 a disconnection signal from the home independent base station 401, the telephone call disconnection processing is executed 345 which is actuated from the independent base station 401. The dual purpose mobile station 402 proceeds to the during indoor self-supporting telephone call state 337 after executing the hold removal re-call out processing 343 for resuming telephone call by removing the hold. If the dual purpose mobile station 402 does not receive 344 the disconnection signal from the home independent base station 401, but detects hold manipulation by the user, and if the indoor self-supporting telephone call is already on-hold 347, transmission of sound signals is restarted 349 after executing processing 348 which removes the hold of the indoor self-supporting telephone call. If the indoor self-supporting telephone call is not on hold 347, the processing 350 is executed that causes the indoor self-supporting telephone call to be put on hold. Silent transmission is begun 351, before ringing a hold-melody in order to notify the hold state to the user 352. If the dual purpose mobile station 402 does not detect the hold manipulation by the user 346, but detects the hook manipulation 353, the hooking signal is transmitted 354 to the public base station 401. The dual purpose mobile station 402 maintains the outdoor public telephone call unless the hooking manipulation is detected.

Operation of the home independent base station control section 105 common to the above described first and the second embodiments will be described with reference to FIG. 18.

Figure 18:
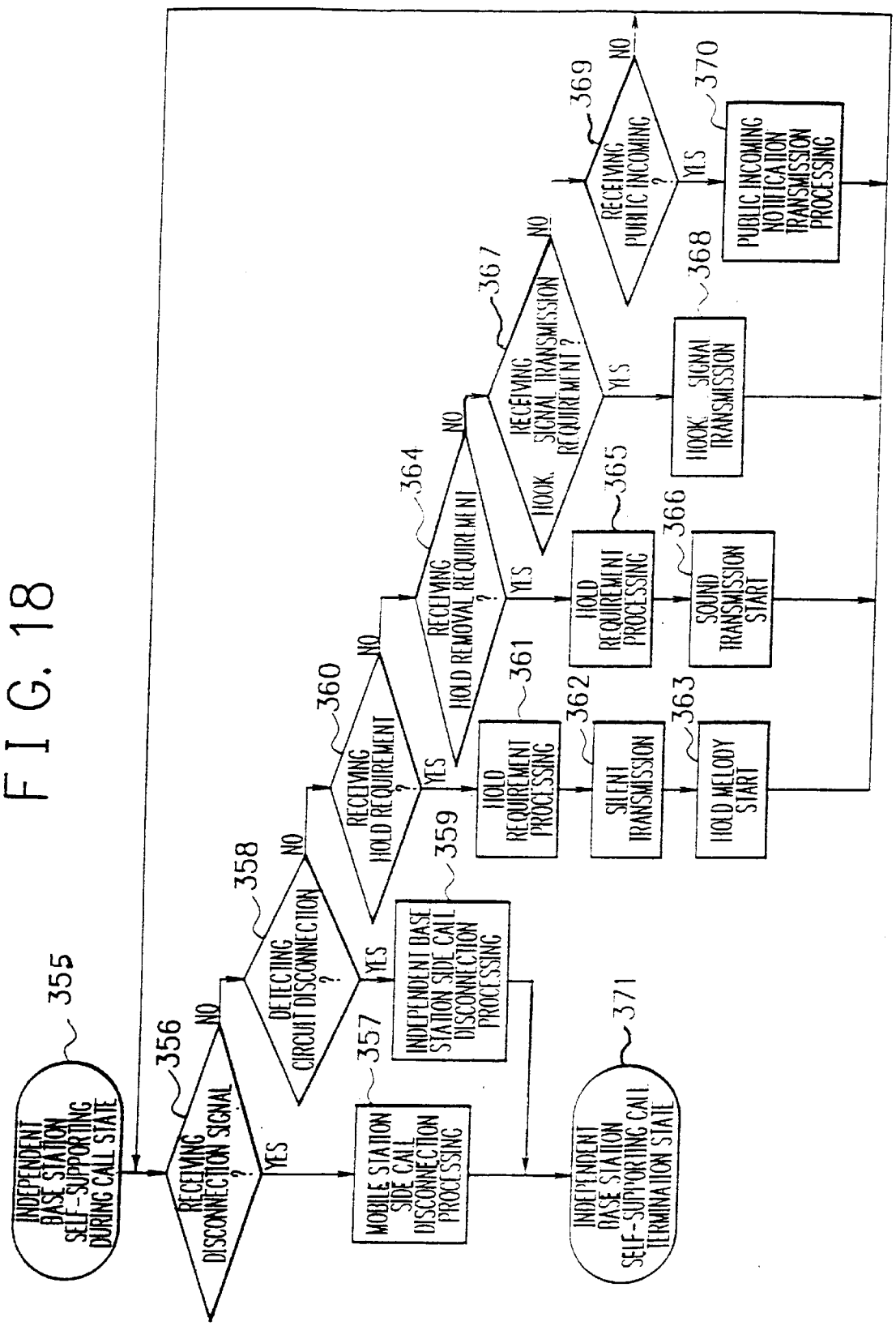
FIG. 18 is a flow chart showing the operation at the time of an indoor self-supporting telephone call of the self-supporting base station control section according to the present invention.

FIG. 18 is a flow chart showing operation of the indoor self-supporting telephone call of the home independent base station control section 105 according to the present invention. When the home independent base station control section 105 receives a disconnection signal 356 during the period of the indoor self-supporting telephone call state 355, it proceeds to indoor self-supporting telephone call end state 371 after executing the telephone call disconnection processing 357 which is actuated from the mobile station 402. If the home independent base station control section 105 does not receive the disconnection signal 356, but detects line disconnection 358, it proceeds to the indoor self-supporting telephone call end state 371 after executing telephone call disconnection processing 359 which is actuated from the independent base station 401. If the home independent base station control section does not detect the line disconnection 358, but receives 360 a hold requirement from the dual purpose mobile station 402, the processing 361 is executed which causes the indoor self-supporting telephone call to be put on hold, causes silent transmission 362, and rings the hold-melody in order to notify the hold state to the user 363. If the home independent base station control section 105 does not receive the hold requirement 360 from the dual purpose mobile station 402, but receives a hold removal requirement 364, transmission of sound signal is restarted 366 after executing the processing 365 which removes the hold state of the indoor self-supporting telephone call operation. If home independent base station control section 105 does not receive the hold removal requirement 364 from the dual purpose mobile station, but receives a hooking signal transmission requirement 367, the hooking signal is transmitted 368. If the home independent base station control section 105 does not receive the hooking signal transmission requirement 367 from the dual purpose mobile station 402, but receives 369 a call signal from the public base station 403 to the dual purpose mobile station 402, a public incoming notification transmission is sent to the dual purpose mobile station 402 by accompanying control channel 370.

As described above, in accordance with the present invention, the home independent base station is provided with the public reception control section, the mobile station reception channel CODEC section, the reception radio circuit, the public reception antenna, and the public reception interface section. The home independent base station receives the call signal transmitted from the public base station intended for the dual purpose mobile station. The call waiting notification signal is then transmitted to the dual purpose mobile station 402 by means of accompanying control channel. The mobile station is thus capable of receiving notification from the public base station 403 due to the fact that the dual purpose mobile station receives the call waiting notification signal from the home base station 401. Consequently, the user of the dual purpose mobile station 402 can respond to the incoming call from the public base station within the area where it is capable of receiving both radio waves both of the public base station and the home independent base station during a indoor self-supporting telephone call.

Further, the home independent base station 401 is provided with the public reception control section, the mobile station reception channel CODEC section, the reception radio circuit, the public reception antenna, and the public reception interface section. The home independent base station 401 transmits the call waiting notification signal to the dual purpose mobile station 402 by means of the accompanying control channel after receiving the call signal transmitted from the public base station intended for the dual purpose mobile station 402. The dual purpose mobile station 402 receives the call waiting notification signal so that the user can recognize the incoming call from the public base station 403. If the user responds thereto, it is capable of shifting to the outdoor public telephone call by executing incoming processing between the public base station 403 and the dual purpose mobile station 402 while the dual purpose mobile station 402 causes the indoor self-supporting telephone call to temporarily be put in a hold state. Consequently, when there is a telephone call from the public base station during a indoor self-supporting telephone call, the user can shift to the outdoor public telephone call, while disconnecting or holding the indoor self-supporting telephone call.

While preferred embodiments of the invention have been described using specific terms, such description is for illustrative purpose only, and it is to be understood that changes and variations may be made with out departing from the spirit or scope of the following claims.

What is claimed is:

1. A cordless telephone system comprising:

an independent base station connected to a fixed network;

a mobile station connected to said independent base station and either to a mobile communication network or said fixed network; and a public base station in which an original communication service control of a mobile communication is executed, wherein when said mobile station is conducting a first telephone call through said independent base station, said public base station transmits a call signal to said mobile station, said independent base station receives said call signal instead of said mobile station and transmits to said mobile station a call waiting notification signal which represents reception of said call signal, said mobile station receives said call waiting notification signal from said independent base station, temporarily puts the first call on hold, executes an incoming processing between said mobile station and said public base station and returns to said first telephone call in response to an action from said user, said mobile station conducts a second telephone call through said public base station while either disconnecting or holding said first telephone call through said independent base station, when said second telephone call through said public base station is terminated, if said first telephone call through said independent base station is held, enabling first telephone call to continue while removing said hold.

2. A cordless telephone system as claimed in claim 1, wherein said independent base station comprises:

an antenna for performing transmission-reception of radio waves;

a transmitter-receiver radio circuit for executing both demodulation of received radio waves and modulation of transmission data;

an independent base station channel CODEC section for executing both decoding of a demodulation signal from said transmitter-receiver radio circuit and coding of transmission data;

a call/circuit control section for executing voice coding of a sound signal received from said fixed network, and voice decoding of voice data which is decoded at said independent base station channel CODEC section, and for receiving a call signal from said fixed network;

a home independent base station control section for executing power control among said call/circuit control section, said independent base station channel CODEC section, and said transmitter-receiver radio circuit, and for executing communication protocol control between said independent base station control section and said mobile station;

a public reception antenna for receiving public radio waves transmitted from said public base station;

a reception radio circuit for executing demodulation of received public radio waves from said public reception antenna;

a mobile station reception channel CODEC section for executing decoding of a demodulation signal from said reception radio circuit;

a public reception control section for detecting said call signal intended for said mobile station from among the decoded data from said mobile station reception channel CODEC section in order to notify said call signal to said home independent base station control section; and a public reception interface section provided within said home independent base station control section for receiving a call signal detection notification from said public reception control section, wherein said independent base station receives said call signal which is transmitted from said public base station to said mobile station during said first telephone call, wherein subsequently, said mobile station receives said call waiting notification signal from said independent base station, wherein before said mobile station disconnects said first telephone call through said independent base station, said mobile station is capable of shifting to the second telephone call through said public base station.

3. A cordless telephone system as claimed in claim 2, wherein before said mobile station shifts to said second telephone call, said first telephone call is temporarily put in a hold state by manipulation of the user, said hold state being removed after disconnection of said second telephone call, whereby said mobile station is capable of being returned to said first telephone call through said independent base station.

4. In a cordless telephone system, a mobile station comprising:

an antenna for performing transmission-reception of radio waves;

a transmitter-receiver radio circuit for executing both demodulation of received radio waves and modulation of transmission data;

a mobile station channel CODEC section for executing both decoding of a demodulation signal from said transmitter-receiver radio circuit and coding of said transmission data;

a speaker for outputting voice audio;

a microphone for inputting voice audio;

a telephone call control section for executing both voice coding of sound signals received from said microphone and voice decoding of voice data decoded by said mobile station channel CODEC section;

a mobile station control section for executing both power control of said telephone call control section, said mobile station channel CODEC section, and said transmitter-receiver radio circuit and for executing communication protocol control; and a call waiting notification detecting section provided within said mobile station control section, and being capable of receiving a call waiting notification signal which represents that a public base station has transmitted a call signal to said mobile station through an independent base station while said mobile station control section is conducing a telephone call through said independent base station.

5. In a cordless telephone system, an independent base station comprising:

an antenna for performing transmission-reception of radio waves;

a transmitter-receiver radio circuit for executing both demodulation of received radio waves and modulation of transmission data;

an independent base station channel CODEC section for executing both decoding of demodulation signals from said transmitter-receiver radio circuit and coding of said transmission data;

a call/circuit control section for executing both voice coding of a sound signal received from a fixed network, and voice decoding of voice data which is decoded by said independent base station channel CODEC section, and for receiving a call signal from said fixed network;

a home independent base station control section for executing power control among said call/circuit control section, said independent base station channel CODEC section, and said transmitter-receiver radio circuit, and for executing communication protocol control between said independent base station and a mobile station;

a public reception antenna for receiving public radio waves which are transmitted from a public base station;

a reception radio circuit for executing demodulation of received public radio waves from said public reception antenna;

a mobile station reception channel CODEC section for executing decoding of demodulation signals from said reception radio circuit;

a public reception control section for detecting a call signal intended for said mobile station from among decoded data from said mobile station reception channel CODEC section in order to notify said home independent base station control section of said call signal; and a public reception interface section provided within said home independent base station control section, for receiving a call signal detection notification from said public reception control section, wherein when said public reception interface section receives said call signal detection notification from said public reception control section, said independent base station transmits a call waiting notification signal notifying said mobile station of said call signal from said public base station.

6. In a cordless telephone system, an independent base station as claimed in claim 5, wherein said home independent base station control section, said public reception interface section, and said public reception control section constitute one block or a plurality of blocks.

7. In a cordless telephone system an independent base station as claimed in claim 5, wherein said independent base station channel CODEC section and said mobile station reception channel CODEC section constitute one block or a plurality of blocks.

8. In a cordless telephone system, an independent base station as claimed in claim 5, wherein said transmitter-receiver radio circuit and said reception radio circuit constitute one functional block or a plurality of functional blocks.

9. A cordless telephone system including an independent base station which is connected to a fixed network, a mobile station which is connected to said independent base station and either to a mobile communication network or a fixed network, and a public base station in which an original communication service control of a mobile communication is executed, wherein when said mobile station is conducting a first telephone call through said independent base station, said public base station transmits a call signal to said mobile station, said call signal identifying a second telephone call a radio communication method comprising the steps of:

receiving said call signal by said independent base station instead of said mobile station and transmitting a call waiting notification signal which represents reception of said call signal toward said mobile station during said first telephone call;

executing an incoming processing between said mobile station and said public base station while executing a temporary hold-manipulation in relation to the first telephone call;

returning to said first telephone call when said incoming processing ends;

enabling said mobile station to execute said second telephone call through said public base station while either disconnecting or holding said first telephone call in relation to said independent base station, when there is a response from the user; and enabling said first telephone (all to continue by removing the holding state, when said second telephone call in relation to said public base station is terminated, and if said first telephone call through said independent base station is maintained by way of the hold state.

10. A radio communication method of an independent base station comprising the steps of:

performing transmission-reception of radio waves using an antenna;

executing both demodulation of received radio waves and modulation of transmission data using a transmitter-receiver radio circuit;

executing both decoding of demodulation signals from said transmitter-receiver radio circuit and coding of transmission data using an independent base station channel CODEC section;

executing both voice decoding of voice data which is decoded by said independent base station channel CODEC section, and voice coding of sound signals from a fixed network, and receiving a voice coding of sound signals received from said fixed network using a call/circuit control section;

executing communication protocol control among said call/circuit control section, said independent base station channel CODEC section, a power control of said transmitter-receiver radio circuit and a mobile station using a home independent base station control section;

receiving public radio waves transmitted from a public base station using a public reception antenna;

executing demodulation of received public radio waves from said public reception antenna using a reception radio circuit;

executing decoding of public demodulation signals from said reception radio circuit by means of a mobile station reception channel CODEC section;

detecting a call signal for said mobile station from among the decoded data from said mobile station reception channel CODEC section in order to notify said call signal to said home independent base station control section, said detecting being performed by a public reception control section, said call signal identifying a second telephone call through said public base station; and receiving a call signal detection notification from said public reception control section using a public reception interface section which is provided within said home independent base station control section, wherein said independent base station receives said call signal which is transmitted from said public base station to said mobile station during a first telephone call through said independent base station, wherein said mobile station receives a call waiting notification signal from said independent base station, wherein before said mobile station disconnects said first telephone call through said independent base station by manipulation of the user said mobile station is capable of shifting to said second telephone call through said public base station.

11. A radio communication method of a mobile station comprising the steps of:

performing transmission-reception of radio waves using an antenna;

executing both demodulation or received radio waves and modulation of transmission data using a transmitter-receiver radio circuit;

executing both decoding of demodulation signals from said transmitter-receiver radio circuit and coding of said transmission data using a mobile station channel CODEC section;

outputting voice audio using a speaker;

inputting voice audio using a microphone;

executing both voice coding of sound signals received from said microphone and voice decoding of voice data decoded by said mobile station channel CODEC section using a telephone call control section;

executing both power source control of said telephone call control section, said mobile station channel CODEC section, and said transmitter-receiver radio circuit and communication protocol control using a mobile station control section; and receiving a call waiting notification signal which represents that a public base station has transmitted a call signal to said mobile station through an independent base station while said mobile station control section is conducting a first telephone call through said independent base station, said reception being performed by a call waiting notification detecting section which is provided within said mobile station control section.

12. A radio communication method of an independent base station comprising the steps of:

performing transmission-reception of radio waves using an antenna;

executing both demodulation of received radio waves and modulation of transmission data using a transmitter-receiver radio circuit;

executing both decoding of demodulation signals from said transmitters-receiver radio circuit and coding of said transmission data using an independent base station channel CODEC section;

executing both voice coding of a sound signal received from a fixed network, and voice decoding of voice data which is decoded by said independent base station channel CODEC section, and receiving a call signal from said fixed network by means of a call/circuit control section;

executing power control among said call/circuit control section, said independent base station channel CODEC section, and said transmitter-receiver radio circuit, and communication protocol control between a mobile station and a home independent base station control section;

receiving public radio waves which are transmitted from a public base station using a public reception antenna;

executing demodulation of received public radio waves from said public reception antenna using a reception radio circuit;

executing decoding of public demodulation signals from said reception radio circuit using a mobile station reception channel CODEC section; and detecting a public call signal for said mobile station from decoded data from said mobile station reception channel CODEC section in order to notify said home independent base station control section of the detection of said public call signal, said detecting being performed by a public reception control section, wherein when said public reception interface section receives a call signal detection notification from said public reception control section, said public base station transmits a call waiting notification signal notifying that it has caused the public call signal to be transmitted to said mobile station.

* * * * *